(12) United States Patent
Gao et al.

(10) Patent No.: US 12,148,250 B2
(45) Date of Patent: Nov. 19, 2024

(54) AI-BASED FACE RECOGNITION METHOD AND APPARATUS, DEVICE, AND MEDIUM

(71) Applicant: TENCENT TECHNOLOGY (SHENZHEN) COMPANY LIMITED, Shenzhen (CN)

(72) Inventors: Yuan Gao, Shenzhen (CN); Zhifeng Li, Shenzhen (CN); Wei Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 379 days.

(21) Appl. No.: 17/685,177

(22) Filed: Mar. 2, 2022

(65) Prior Publication Data
US 2022/0309836 A1    Sep. 29, 2022

Related U.S. Application Data

(63) Continuation of application No. PCT/CN2020/124944, filed on Oct. 29, 2020.

(30) Foreign Application Priority Data

Jan. 22, 2020    (CN) .......................... 202010075684.7

(51) Int. Cl.
*G06V 40/40*    (2022.01)
*G06V 10/56*    (2022.01)
(Continued)

(52) U.S. Cl.
CPC .............. *G06V 40/45* (2022.01); *G06V 10/56* (2022.01); *G06V 10/774* (2022.01);
(Continued)

(58) Field of Classification Search
CPC ...... G06V 40/45; G06V 10/56; G06V 10/774; G06V 10/776; G06V 10/82; G06V 20/64;
(Continued)

(56) References Cited

U.S. PATENT DOCUMENTS

| | | |
|---|---|---|
| 10,783,354 B2 | 9/2020 | Zheng et al. |
| 2006/0120576 A1* | 6/2006 | Chen .................. G06V 40/1312 382/124 |

(Continued)

FOREIGN PATENT DOCUMENTS

| | | |
|---|---|---|
| CN | 102622588 A | 8/2012 |
| CN | 105975935 A | 9/2016 |

(Continued)

OTHER PUBLICATIONS

The World Intellectual Property Organization (WIPO) International Search Report for PCT/CN2020/124944 Jan. 29, 2021 7 Pages (including translation).

(Continued)

*Primary Examiner* — Nimesh Patel
(74) *Attorney, Agent, or Firm* — Banner & Witcoff, Ltd.

(57) ABSTRACT

An artificial intelligence (AI)-based face recognition method includes: obtaining n groups of input video frames, at least one group of video frames including a color video frame and a depth video frame of a target face, n being a positive integer; invoking an interactive liveness detection function to recognize the color video frames in the n groups of video frames; invoking a second three-dimensional (3D) structured-light liveness detection function to recognize the depth video frames in the n groups of video frames; and determining, in response to both detection results of the interactive liveness detection function and the 3D structured-light liveness detection function indicating that a type of the target face being a liveness type, that the target face is a live target face.

16 Claims, 11 Drawing Sheets

(a)

(b)

(c)

(51) Int. Cl.
*G06V 10/774* (2022.01)
*G06V 10/776* (2022.01)
*G06V 10/82* (2022.01)
*G06V 20/64* (2022.01)
*G06V 40/16* (2022.01)
*G06V 40/20* (2022.01)
*G06F 21/32* (2013.01)

(52) U.S. Cl.
CPC ............ *G06V 10/776* (2022.01); *G06V 10/82* (2022.01); *G06V 20/64* (2022.01); *G06V 40/171* (2022.01); *G06V 40/172* (2022.01); *G06V 40/20* (2022.01); *G06F 21/32* (2013.01)

(58) Field of Classification Search
CPC .... G06V 40/171; G06V 40/172; G06V 40/20; G06V 40/161; G06V 10/764; G06V 40/166; G06V 40/168; G06V 40/10; G06V 40/70; G06V 40/15; G06V 40/40; G06V 40/167; G06V 40/193; G06V 40/18; G06V 10/803; G06V 10/88; G06V 10/255; G06V 40/117; G06V 40/1388; G06V 40/174; G06V 40/28; G06V 2201/03; G06V 40/197; G06V 10/70; G06V 40/16; G06V 20/653; G06V 40/173; G06F 21/32; G06F 21/45; G06F 3/013; G06F 3/017; G06F 3/011; G06F 18/00; G06F 18/2413; G06F 16/5838; Y02T 10/40; B60R 25/255; B60R 25/25; B60R 2021/01315; B60R 21/01538; G06T 17/00; G06T 2207/30201; G06T 7/0012; G06T 2207/10016; G06T 7/33; G06T 7/73; G06T 2207/10012; G06T 1/0007; G06T 2207/20081; G06T 7/11; G06T 2200/04; G06T 2200/21; G06T 2210/04; G06T 7/593; G06T 7/85
See application file for complete search history.

(56) References Cited

U.S. PATENT DOCUMENTS

| | | | |
|---|---|---|---|
| 2011/0299741 A1* | 12/2011 | Zhang | G06V 40/45 |
| | | | 382/117 |
| 2016/0143584 A1 | 5/2016 | Inagaki | |
| 2018/0232561 A1* | 8/2018 | Zheng | G06V 40/171 |
| 2020/0151428 A1* | 5/2020 | Guo | G06V 40/173 |
| 2020/0311404 A1* | 10/2020 | Derakhshani | G06V 40/11 |
| 2021/0397817 A1* | 12/2021 | Su | H04N 23/11 |

FOREIGN PATENT DOCUMENTS

| | | |
|---|---|---|
| CN | 108182409 A | 6/2018 |
| CN | 109034102 A | 12/2018 |
| CN | 111242090 A | 6/2020 |

OTHER PUBLICATIONS

K. Zhang et al., "Joint face detection and alignment using multitask cascaded convolutional networks," IEEE Signal Processing Letters, vol. 23, issue 10, pp. 1499-1503, 2016. 5 pages.

Karen Simonyan et al., "Very Deep Convolutional Networks for Large-Scale Image Recognition," International Conference of Learning Representations, 2015. 14 pages.

A. Newell et al., "Stacked hourglass networks for human pose estimation," In: European Conference on Computer Vision, pp. 483-499. Springer, 2016. 17 pages.

* cited by examiner

AI-BASED FACE RECOGNITION METHOD AND APPARATUS, DEVICE, AND MEDIUM

CROSS-REFERENCES TO RELATED APPLICATIONS

This application is a continuation application of PCT Patent Application No. PCT/CN2020/124944, entitled "ARTIFICIAL INTELLIGENCE-BASED FACE RECOGNITION METHOD AND APPARATUS, DEVICE, AND MEDIUM" and filed on Oct. 29, 2020, which claims priority to Chinese Patent Application No. 202010075684.7, entitled "AI-BASED FACE RECOGNITION METHOD AND APPARATUS, DEVICE, AND MEDIUM", filed on Jan. 22, 2020, the entire contents of both of which are incorporated herein by reference.

FIELD OF THE TECHNOLOGY the present disclosure relates to the field of computer vision (CV) technologies, and in particular, to an artificial intelligence (AI)-based face recognition method and apparatus, a device, and a medium.

BACKGROUND OF THE DISCLOSURE

A face liveness detection technology is to verify, in a specific detection manner by using technologies such as face key point positioning and face tracking, whether a user operation is an operation of a real live person.

In the related art, three-dimensional (3D) structured-light is used for face liveness verification. A structured-light camera is used to emit uniformly spaced lights that are in a stripe shape to a target. If the target is a real live face, due to the 3D structure of the face, the reflected lights in the stripe shape inevitably have inconsistent intervals. On the contrary, the reflected structured-lights have the same interval.

The above manner of face liveness detection cannot effectively defend against online face verification attacks whose attack types are a synthetic attack and a copy attack, which tends to threaten user information security.

SUMMARY

Embodiments of the present disclosure provide an AI-based face recognition method and apparatus, a device, and a medium, which can defend against online face verification attacks whose attack types are a synthetic attack, a copy attack, and a mask attack, protecting user information security. The technical solutions are as follows:

According to one aspect of the present disclosure, an AI-based face recognition method is provided and is applicable to a computer device. The method includes: obtaining n groups of input video frames, at least one group of video frames including a color video frame and a depth video frame of a target face, n being a positive integer; invoking an interactive liveness detection function to recognize the color video frames in the n groups of video frames; invoking a second three-dimensional (3D) structured-light liveness detection function to recognize the depth video frames in the n groups of video frames; and determining, in response to both detection results of the interactive liveness detection function and the 3D structured-light liveness detection function indicating that a type of the target face being a liveness type, that the target face is a live target face.

According to another aspect of the present disclosure, an AI-based face recognition apparatus is provided. The apparatus includes: an obtaining module, configured to obtain n groups of input video frames, at least one group of video frames including a color video frame and a depth video frame of a target face, n being a positive integer; a first liveness detection function, configured to recognize the color video frames in the n groups of video frames, the first liveness detection function being an interactive liveness detection function; a second liveness detection function, configured to recognize the depth video frames in the n groups of video frames, the second liveness detection function being a 3D structured-light liveness detection function; and a processing module, configured to determine, in response to both detection results of the first liveness detection function and the second liveness detection function indicating that a type of the target face being a liveness type, that the target face is a live target face.

According to another aspect of the present disclosure, a computer device is provided, and includes: a processor and a memory, the memory storing one or more computer programs. The processor is configured to load and execute the one or more computer programs to implement: obtaining n groups of input video frames, at least one group of video frames including a color video frame and a depth video frame of a target face, n being a positive integer; invoking an interactive liveness detection function to recognize the color video frames in the n groups of video frames; invoking a second three-dimensional (3D) structured-light liveness detection function to recognize the depth video frames in then groups of video frames; and determining, in response to both detection results of the interactive liveness detection function and the 3D structured-light liveness detection function indicating that a type of the target face being a liveness type, that the target face is a live target face.

According to another aspect of the present disclosure, a non-transitory computer-readable storage medium is provided, the storage medium storing at least one instruction, at least one program, a code set or an instruction set, the at least one instruction, the at least one program, the code set or the instruction set being loaded and executed by a processor to implement the AI-based face recognition method as described in the above aspect.

According to another aspect of the present disclosure, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, so that the computer device performs the AI-based face recognition method as described in the above aspect.

The technical solutions provided in the embodiments of the present disclosure include at least the following beneficial effects:

A first liveness detection function and a second liveness detection function are combined. When both detection results of the two liveness detection functions indicate that a target face in a video frame is a liveness type, the video frame includes a live target face. The first liveness detection function can resist a copy attack and a mask attack, and the second liveness detection function can resist a synthetic attack and the copy attack, which can protect user information security more comprehensively.

DESCRIPTION OF EMBODIMENTS

Figure 1:
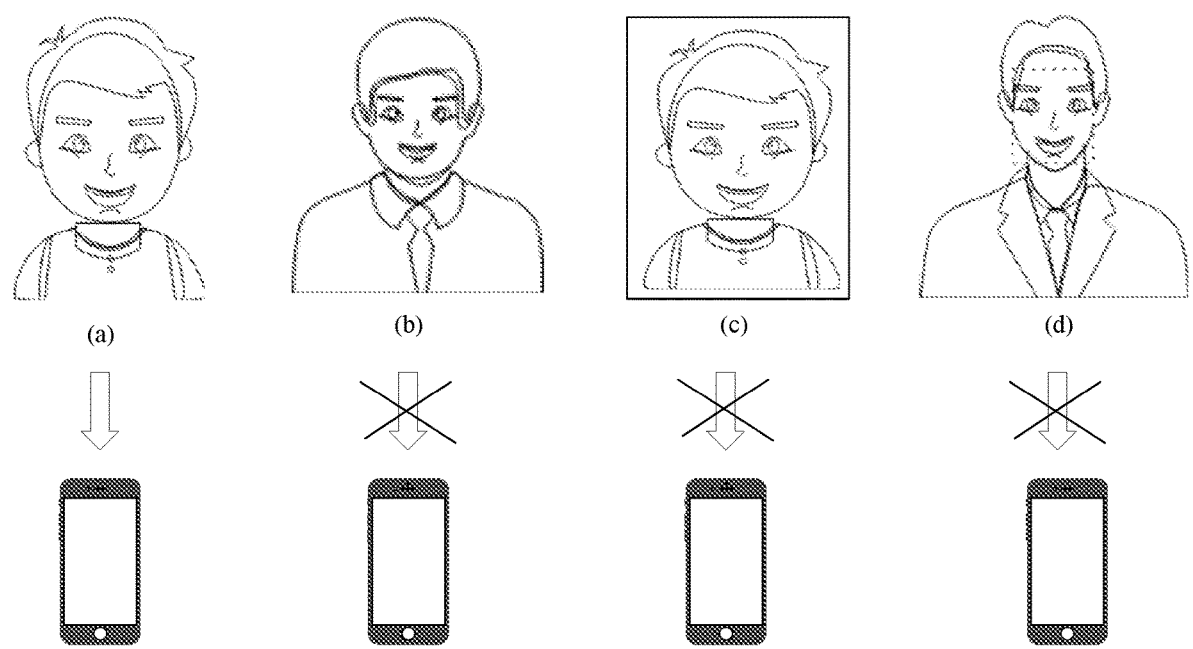
FIG. 1 is a schematic diagram of live face detection for different types of attacks according to an exemplary embodiment of the present disclosure.

First, terms involved in the embodiments of the present disclosure are introduced:

AI is a theory, method, technology, and application system that use a digital computer or a machine controlled by a digital computer to simulate, extend, and expand human intelligence, perceive the environment, obtain knowledge, and use the knowledge to obtain the best result. In other words, AI is a comprehensive technology of computer science, which attempts to understand essence of intelligence and produces a new intelligent machine that responds in a manner similar to human intelligence. AI is to study design principles and implementation methods of various intelligent machines, so that the machines have the functions of perception, reasoning, and decision-making.

The AI technology is a comprehensive discipline, covering a wide range of fields, and including both a hardware-level technology and a software-level technology. Basic AI technologies generally include technologies such as sensor, dedicated AI chip, cloud computing, distributed storage, a big data processing technology, operation/interaction system, and mechatronics. AI software technologies mainly include several major directions such as a computer vision technology, a speech processing technology, a natural language processing technology, and machine learning/deep learning.

With the research and progress of the AI technology, the AI technology is studied and applied to a plurality of fields such as a common smart home, a smart wearable device, a virtual assistant, a smart speaker, smart marketing, unmanned driving, automatic driving, an unmanned aerial vehicle, a robot, smart medical care, smart customer service, identity verification, and live face recognition. It is believed that with the development of technologies, the AI technology will be applied to more fields, and play an increasingly important role.

CV is a science that studies how to use a machine to "see", and furthermore, is machine vision that a camera and a computer are used for replacing human eyes to perform recognition, tracking, measurement, and the like on a target, and further perform graphic processing, so that the computer processes the target into an image more suitable for human eyes to observe, or an image transmitted to an instrument for detection. As a scientific discipline, CV studies related theories and technologies and attempts to establish an AI system that can obtain information from images or multi-dimensional data. The CV technologies generally include technologies such as image processing, image recognition, image semantic understanding, image retrieval, optical character recognition (OCR), video processing, video semantic understanding, video content/behavior recognition, a 3D technology, virtual reality, augmented reality, synchronous positioning, and map construction, and further include biometric feature recognition technologies such as common face recognition and fingerprint recognition.

The solution provided in the embodiments of the present disclosure relates to the field of live face detection technologies. When both recognition results of a first liveness detection function and a second liveness detection function are a live face, it is determined that a target face in a detected video frame is a live face. When a recognition result of at least one of the first liveness detection function or the second liveness detection function is a non-live face, it is determined that the target face in the detected video frame is not the live face.

In the related art, whether the target face is the live face is distinguished by using two manners: dynamic interactive verification and 3D structured-light face liveness verification.

The dynamic interactive verification means that a user needs to perform corresponding actions according to system instructions, such as blinking, mouth opening, text or number reading, head turning, and the like. The 3D structured-light face liveness verification means that a structured-light camera is used to emit uniformly spaced lights that are in a stripe shape to a target, to determine, according to whether the reflected lights in the stripe shape are uniformly spaced, whether the target is a real live face.

Main attack manners for the above two verification manners are as follows:

1. Synthetic attack: A face of another person is synthesized as an attack sample through the face synthesis technology based on deep learning. The attacker can control the synthesized face of the another person to perform a series of specified actions.
2. Copy attack: A copy attack is performed by copying an identification card, a photo, a printing paper, a video played by another playback device, and the like.
3. Mask attack: An attack performed by wearing a mask made according to the appearance of others.

Because the synthetic attack and the copy attack do not provide effective 3D depth information, the synthetic attack and the copy attack can be effectively defended in the manner of 3D structured-light face verification. However, the manner of 3D structured-light face verification cannot defend against the mask attack.

Because it is difficult for the attacker to perform the required actions or action sequences in the copy attack and the mask attack, the copy attack and the mask attack can be effectively defended in the manner of dynamic interactive verification. However, the dynamic interactive verification cannot effectively defend against the synthetic attack. In addition, in the manner of dynamic interactive verification, a related model needs to be trained to recognize actions performed by the user, and action data needs to be marked. In a process of marking the data, a person whose data is acquired not only needs to perform corresponding actions according to prompts, but also needs to record a time required for each action, increasing the difficulty of data acquisition.

Based on the above situation, the embodiments of the present disclosure provide an AI-based face recognition method, which combines the above two liveness detection manners together. Whether a face in front of a camera is a picture corresponding to another medium (for example, an image, a video, a photo, a printing paper, and an identification card) is recognized by using the first liveness detection function and the second liveness detection function, to determine whether the face is a live face, which improves accuracy of liveness verification, and ensures user information security.

FIG. 1 is a schematic diagram of live face detection for different types of attacks according to an exemplary embodiment of the present disclosure. An example in which a terminal is a smartphone is used. A program supporting recognition of a live face is run on the smartphone. The program includes a first liveness detection function and a second liveness detection function, a target object shoots a video frame including the face of the target object by using the smartphone, and the smartphone recognizes whether the target face is a live target face.

As shown in (a) in FIG. 1, a first target object is a live object, a first target face is a live face. The first liveness detection function can recognize, according to a color video frame, an action completed by the first target object, and the second liveness detection function can recognize depth information of the first target face according to a depth video frame, so that the smartphone can recognize that the target face is the live face.

As shown in (b) in FIG. 1, a face of a second target object is a second target face synthesized by combining facial parts of the first target object shown in (a) in FIG. 1, and can be controlled to perform a series of actions. The first liveness detection function recognizes, according to the color video frame, that the second target object is a live face, and the second liveness detection function recognizes, according to the depth video frame, that the second target face does not have the depth information, that is, the second target face is not the live face, so that the smartphone recognizes that the second target face is not the live face.

As shown in (c) in FIG. 1, a face of a third target object is the face of the first target object in a photo. The first liveness detection function recognizes, according to the color video frame, that the third target face cannot perform an action, and the second liveness detection function recognizes, according to the depth video frame, that the third target face does not have the depth information, so that the smartphone recognizes that the third target face is not the live face.

As shown in (d) in FIG. 1, a fourth target object wears a mask made according to the face of the first target object. The first liveness detection function recognizes, according to the color video frame, that the fourth target face cannot perform an action, and the second liveness detection function recognizes, according to the depth video frame, that the fourth target face has the depth information, so that the smartphone recognizes that the fourth target face is not the live face.

The smartphone running the program supporting the recognition of a live face can defend against a synthetic attack, a copy attack, and a mask attack, and can deal with various types of sample attacks more comprehensively, ensuring user information security.

The embodiments of the present disclosure provide an AI-based face recognition method. The method may be applicable to a server. A user uploads a video frame to the server, the server performs live face verification and performs subsequent operations. The method may alternatively be applicable to a terminal. By running a program supporting live face detection on the terminal, live face verification is performed on a video frame shot by the user, and the user can upload a verification result to the server for subsequent operations.

Figure 2:
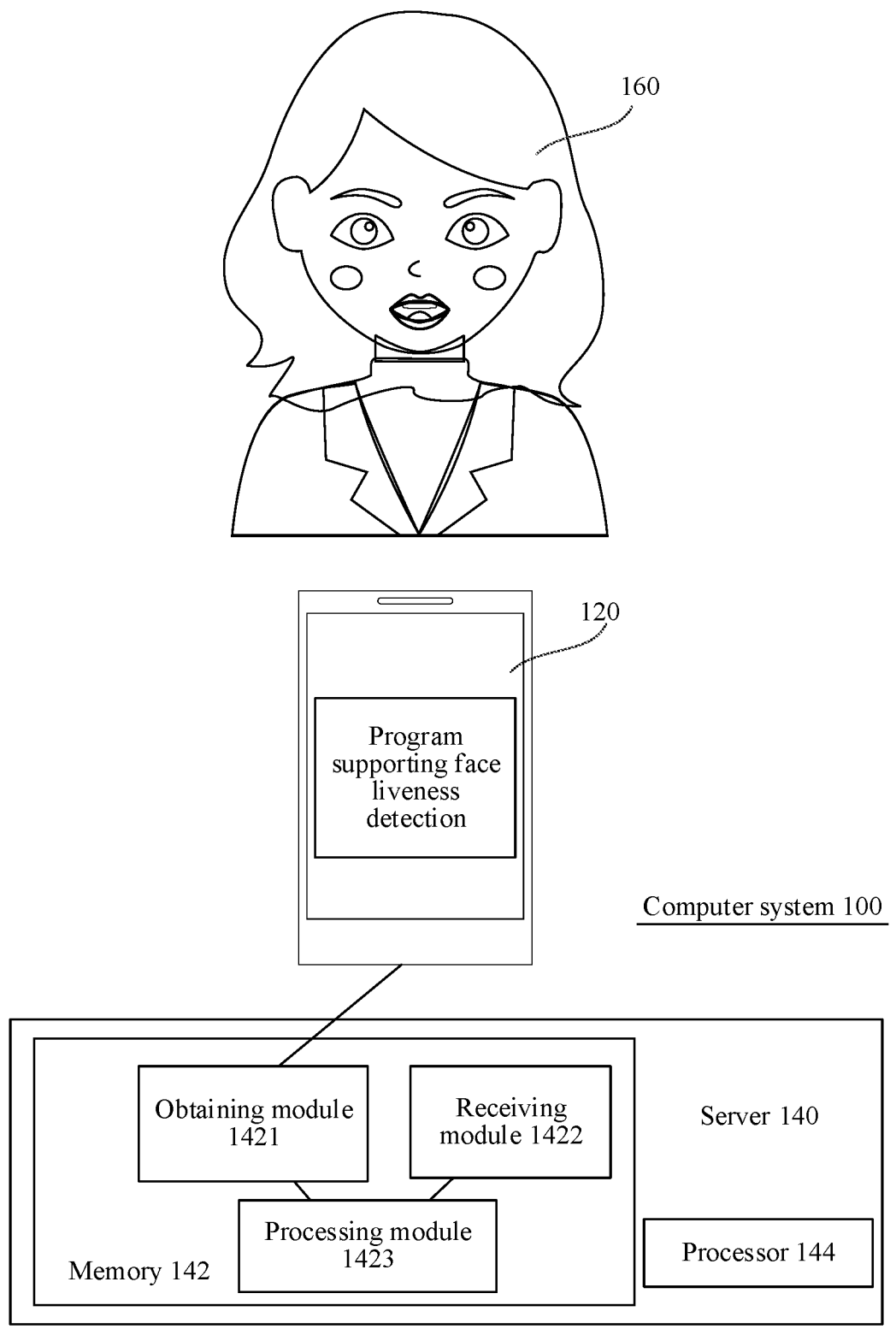
FIG. 2 is a schematic structural diagram of a computer system according to an exemplary embodiment of the present disclosure.

FIG. 2 is a structural diagram of a computer system according to an exemplary embodiment of the present disclosure. The computer system 100 includes a terminal 120 and a server 140.

An application program supporting face liveness detection is installed and run on the terminal 120. The application program may be any one of an applet, a web page, or an information interaction platform (for example, an official account). A 3D camera (including a color camera and a depth camera) is disposed on the terminal 120 for acquiring a face image (including at least one of a photo or a video frame) of a user 160. In one embodiment, the terminal 120 continuously shoots photos or shoots a video of the face of the user 160 at a certain frequency. The face image of the user 160 may be an image with additional actions such as blinking, head turning, smiling, and mouth opening, or an image without additional actions. The terminal 120 may generally refer to one of a plurality of terminals. In this embodiment, the terminal 120 is merely used as an example for description. Types of a terminal device include at least one of a smartphone, a tablet computer, an e-book reader, a Moving Picture Experts Group Audio Layer III (MP3) player, a Moving Picture Experts Group Audio Layer IV (MP4) player, a laptop portable computer, or a desktop computer. The following embodiment is described by using an example in which the terminal includes a smartphone.

The terminal 120 is connected to the server 140 by using a wireless network or a wired network. The server 140 includes at least one of one server, a plurality of servers, a cloud computing platform, and a virtualization center. For example, the server 140 includes a processor 144 and a memory 142. The memory 142 includes an obtaining module 1421, a processing module 1422, and a receiving module 1423. The server 140 is configured to provide a background service to the program supporting face liveness detection. Exemplarily, a backend server may provide storage services for face images, or provide computing services for live face detection, or provide verification services for live face detection. In one embodiment, the server 140 is responsible for primary computing work, and the terminal 120 is responsible for secondary computing work; or the server 140 is responsible for secondary computing work, and the terminal 120 is responsible for primary computing; or a distributed computing architecture is adopted between the server 140 and the terminal 120 to perform collaborative computing.

A person skilled in the art may learn that there may be more or fewer terminals. For example, there may be only one terminal, or there may be tens of or hundreds of or more terminals. The quantity and the device type of the terminals are not limited in the embodiments of the present disclosure.

Figure 3:
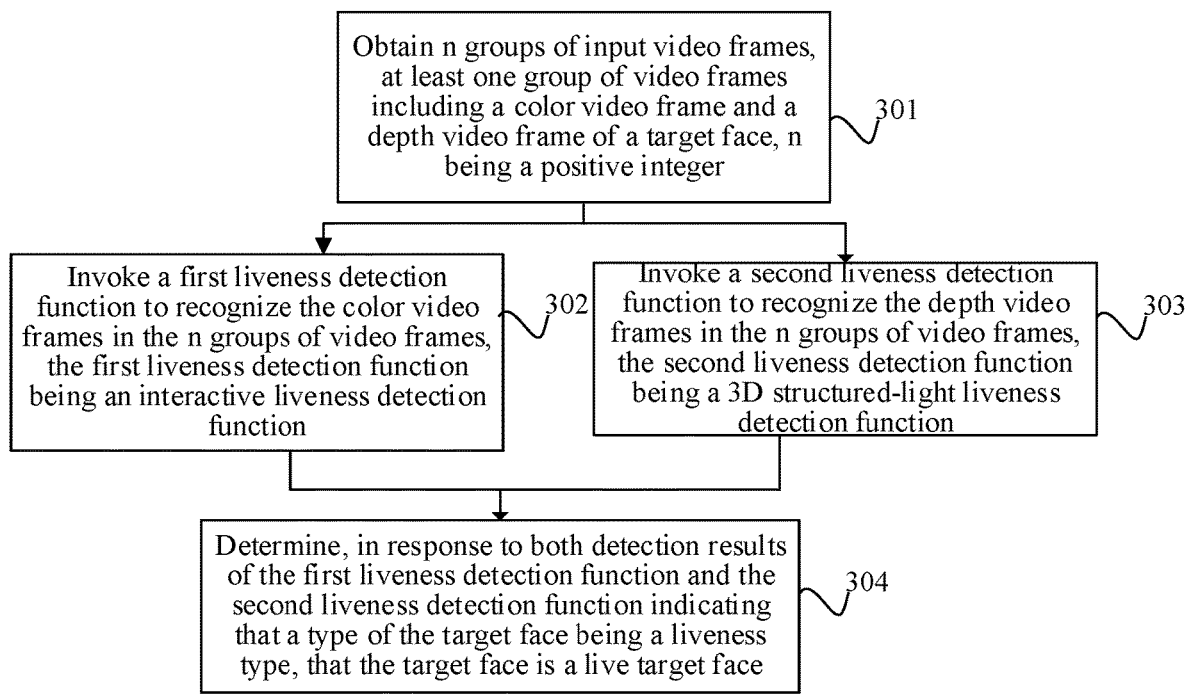
FIG. 3 is a flowchart of an AI-based face recognition method according to an exemplary embodiment of the present disclosure.

FIG. 3 shows an AI-based face recognition method according to an exemplary embodiment of the present disclosure. The method is applicable to the terminal 120 in the computer system shown in FIG. 2 or another computer system. The method includes the following steps:

Step 301: Obtain n groups of input video frames, at least one group of video frames including a color video frame and a depth video frame of a target face, n being a positive integer.

A terminal with an image acquisition function is used to acquire video frames of the target face. Exemplarily, the terminal includes at least one of a smartphone, a tablet computer, a notebook computer, a desktop computer connected with a camera, a camera, or a video camera. The terminal is used to continuously shoot a face of the target object. Exemplarily, the continuous shooting is to shoot a video.

At each shooting moment, both the color video frame and the depth video frame are shot at the same time. The color video frame and the depth video frame shot at the same shooting moment form a group of video frames.

The color video frame is a color video frame in a red, green, and blue (RGB) format. Each pixel in the depth video frame stores a distance (depth, D) value between the depth camera and each real point in a scene. Exemplarily, the real point is a point on the target face.

Exemplarily, the color video frame and the depth video frame are stored as two associated video frames, for example, the shooting moment is used for association. Alternatively, the color video frame and the depth video frame are stored as the same video frame. For example, the video frame includes four channels of R, G, B, and D. A specific storage manner of the color video frame and the depth video frame is not limited in this embodiment of the present disclosure.

Step 302: Invoke a first liveness detection function to recognize the color video frames in the n groups of video frames, the first liveness detection function being an interactive liveness detection function.

In one embodiment, the first liveness detection function includes a neural network model and a program unit. The program unit may be a calculation unit or an AI classifier.

In one embodiment, the neural network model includes a stacked hourglass network. The neural network model in the first liveness detection function may recognize a facial feature point on the target face in the color video frame, and obtain position coordinates of the facial feature point on the target face. The facial feature point is a feature point corresponding to a position of a facial part, for example, a nose feature point. The facial parts include at least one of an eyebrow, an eye, a nose, a mouth, or an ear. In this embodiment of the present disclosure, the facial feature point includes a left eye, a right eye, the nose, a left corner of the mouth, and a right corner of the mouth of the target face. Further, a distance change of the facial feature point is calculated by the calculation unit, or the distance change of the facial feature point is determined by the AI classifier, so as to determine whether the target face completes a target action.

Step 303: Invoke a second liveness detection function to recognize the depth video frames in the n groups of video frames, the second liveness detection function being a 3D structured-light liveness detection function.

In one embodiment, the second liveness detection function includes a VGG-16 deep learning network. The second liveness detection function can recognize whether there is a live target face in the depth video frame, and exemplarily, output a probability that the target face is a live face. For example, if the probability outputted by the second liveness detection function is 96%, the depth video frame recognized by the second liveness detection function includes the live target face.

Step 304: Determine, in response to both detection results of the first liveness detection function and the second liveness detection function indicating that a type of the target face being a liveness type, that the target face is a live target face.

After the first liveness detection function recognizes the target face in the color video frame, and an obtained detection result is a non-liveness type, the target face is a non-live target face. After the second liveness detection function recognizes the target face in the depth video frame, and an obtained detection result is a non-liveness type, the target face is the non-live target face. After the first liveness detection function and the second liveness detection function recognize the target face in the video frame, and both obtained detection results are non-liveness types, the target face is the non-live target face.

In an example, the first liveness detection function recognizes the target face in the color video frame to obtain a mouth feature point of the target face. By calculating a position change of the mouth feature point, it is concluded that the target face completes a mouth opening action. The second liveness detection function recognizes the target face in the depth video frame, and obtains a probability that the target face is the live target face is 98%. Therefore, the target face in the video frame formed by the color video frame and the depth video frame is the live target face.

It may be understood that the first liveness detection function and the second liveness detection function in the foregoing embodiment may be models constructed by any neural network.

Based on the above, in the method provided in this embodiment, by combining the first liveness detection function and the second liveness detection function, the first liveness detection function can resist a copy attack and a mask attack, and the second liveness detection function can resist a synthetic attack and the copy attack, which can protect user information security more comprehensively.

A training manner of the neural network model in the first liveness detection function is described below, and the neural network model is obtained through training in the following manner:

S1: Obtain a training sample set, the training sample set including a plurality of groups of sample face images and a sample facial feature point.

The sample face image includes a photo or a face image included in the n groups of video frames, the sample facial feature point includes a left eye, a right eye, the nose, a left corner of the mouth, and a right corner of the mouth of a sample face. The sample facial feature point may be manually marked, or the sample face image may be inputted into a model having a capability of marking a feature point, to recognize the facial feature point, or a public data set with the facial feature points marked in the related art can be used.

S2: Invoke the first liveness detection function to recognize the sample face image, to obtain a predicted facial feature point of the sample face.

S3: Compare the sample facial feature point of the sample face with the predicted facial feature point of the sample face to calculate an error loss.

In an example, predicted position coordinates of a nose feature point are (x1, y1), and actual position coordinates of a nose feature point of the sample face are (x0, y0). The two nose feature points are compared to calculate an error loss.

In one embodiment, error calculation may be performed on the sample facial feature point and the predicted facial feature point by using an error loss function. The error loss function may be a smooth one-norm loss function, or a Euclidean loss function, or a normalized loss exponential function, or another error loss function.

S4: Train the first liveness detection function based on the error loss and by using an error backpropagation algorithm to obtain a trained first liveness detection function.

The error loss between the sample facial feature point and the predicted facial feature point of the sample face is continuously reduced. The predicted facial feature point outputted by the first liveness detection function is consistent with a marked sample facial feature point, and the training of the first liveness detection function is completed.

A training manner of the second liveness detection function is described below, and the second liveness detection function is obtained through training in the following manner:

S11: Obtain a training sample set, the training sample set including depth images of a plurality of groups of sample face images and liveness results of the sample faces.

In one embodiment, the depth image of the sample face is acquired by a depth camera. A manner of how to obtain the depth image of the sample face is not limited in the present disclosure.

The liveness result of the sample face includes whether the sample face is a live face or a non-live face. The liveness result of the sample face may be manually marked, or may be recognized by another model.

S22: Invoke the second liveness detection function to recognize the sample face image, to obtain a probability that the sample face is the live face.

S33: Compare the liveness result of the sample face with the probability that the sample face is the live face, to calculate an error loss.

In an example, if the liveness result of the sample face is a live sample face (that is, the probability that the sample face is the live face is 100%), a prediction result of the second liveness detection function is that the probability that the sample face is the live face is 95%. The two probabilities are compared to calculate an error loss.

In one embodiment, error calculation may be performed, by using an error loss function, on the liveness result of the sample face and the probability that the sample face is the live face. The error loss function may be a smooth one-norm loss function, or a Euclidean loss function, or a normalized loss exponential function, or another error loss function.

S44: Train the second liveness detection function based on the error loss and by using an error backpropagation algorithm to obtain a trained second liveness detection function.

In one embodiment, the training manner of the second liveness detection function may be different from that of the first liveness detection function.

Figure 4:
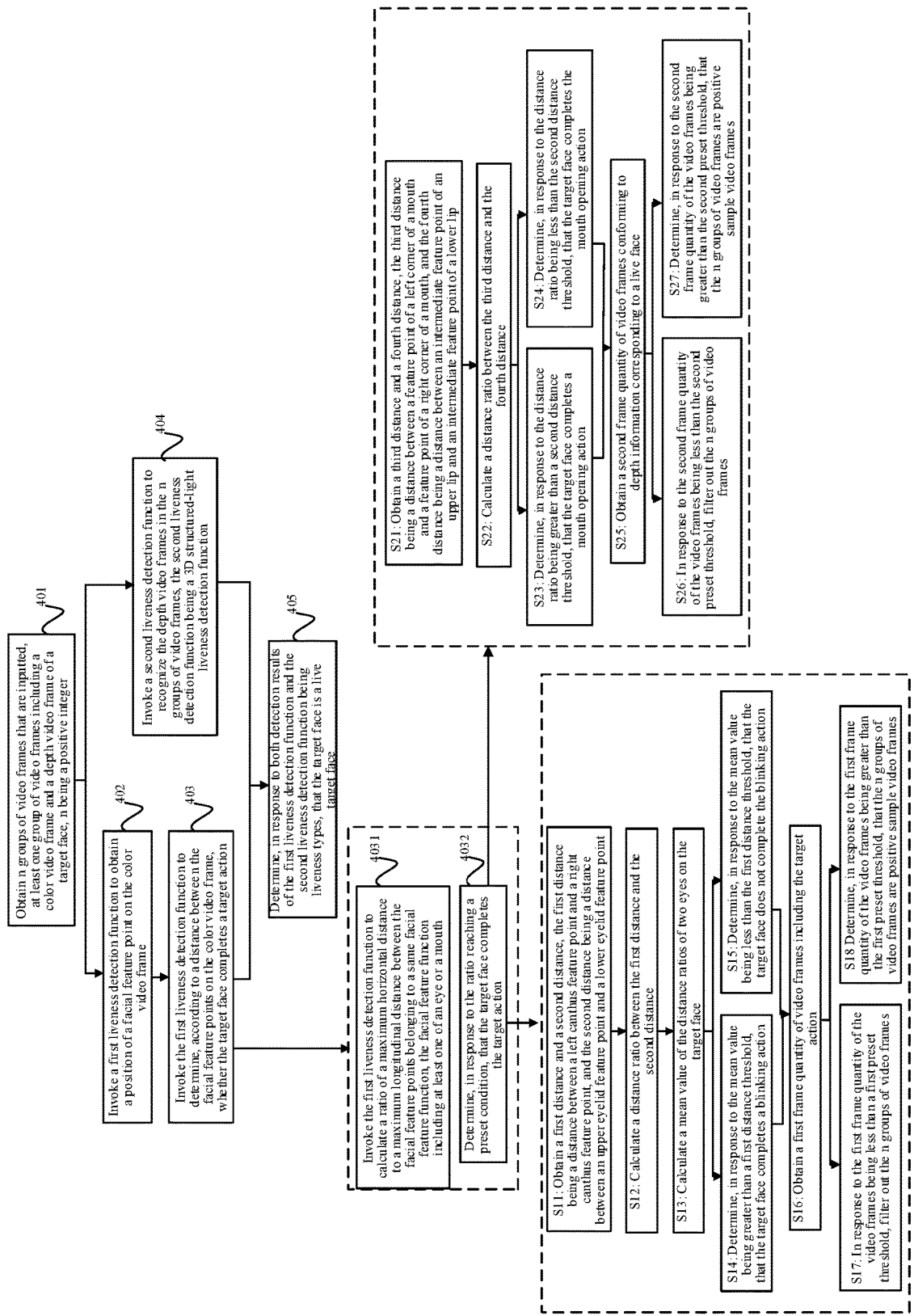
FIG. 4 is a flowchart of an AI-based face recognition method according to another exemplary embodiment of the present disclosure.

FIG. 4 shows an AI-based face recognition method according to another exemplary embodiment of the present disclosure. The method is applicable to the terminal 120 in the computer system shown in FIG. 2 or another computer system. The method includes the following steps:

Step 401: Obtain n groups of input video frames, at least one group of video frames including a color video frame and a depth video frame of a target face, n being a positive integer.

Step 401 is consistent with step 301 shown in FIG. 3, and details are not described herein again.

Step 402: Invoke a neural network model in a first liveness detection function to obtain a position of a facial feature point on the color video frame.

In one embodiment, the first liveness detection function includes a neural network model and a program unit. The program unit may be a calculation unit or a program unit for classification, and the program unit for classification may be an AI classifier.

In one embodiment, the neural network model includes a stacked hourglass neural network. Each stacked hourglass neural network includes a multi-scale bottom-up feature extraction encoder and a multi-scale top-down decoder. The encoder and decoder are symmetrical in scaling. A combination of symmetrical multi-scale encoder and decoder can extract multi-scale features and finally output 106 heatmaps. Each heatmap corresponds to a feature point, and a position of a final feature point is coordinates corresponding to a maximum value point of each heatmap. The stacked hourglass neural network performs further refined operation on an extracted feature point by stacking a plurality of hourglass networks. The refined operation is an operation of accurately calculating the feature point to obtain an accurate position of the feature point.

Step 403: Invoke the first liveness detection function to determine, according to a distance between the facial feature points on the color video frame, whether the target face completes a target action.

This step includes the following substeps:

Step 4031: Invoke the first liveness detection function to calculate a ratio of a maximum horizontal distance to a maximum longitudinal distance between the facial feature points belonging to a same facial feature part, the facial feature part including at least one of an eye or a mouth.

Exemplarily, the facial part includes an eye. Eye feature points include a left eye feature point, a right eye feature point, an upper eyelid feature point, and a lower eyelid feature point. As eyes shown in FIG. 5(*a*), white dots are used to represent facial feature points, a maximum horizontal distance between the facial feature points is a distance between a left canthus feature point and a right canthus feature point, a maximum longitudinal distance is a distance between an upper eyelid feature point and a lower eyelid feature point. The upper eyelid feature point is a feature point at a midpoint of the upper eyelid, and the lower eyelid feature point is a feature point at a midpoint of the lower eyelid.

Exemplarily, the facial part includes a mouth. Mouth feature points include a feature point of a left corner of the mouth, a feature point of a right corner of the mouth, an upper lip feature point, and a lower lip feature point. As a mouth shown in FIG. 5(*a*), white dots are used to represent facial feature points, a maximum horizontal distance between the facial feature points is a distance between the feature point of the left corner of the mouth and the feature point of the right corner of the mouth, a maximum longitudinal distance is a distance between the upper lip feature point and the lower lip feature point. The upper lip feature point is a feature point at a midpoint of the upper lip, that is, a feature point at the intersection of the two lip peaks, and the lower lip feature point is a feature point at a midpoint of the lower lip.

Step 4032: Determine, in response to the ratio reaching a preset condition, that the target face completes the target action.

In one embodiment, the preset condition includes that a distance ratio reaches a distance threshold. In one embodiment, the target action includes at least one of a blinking action or a mouth opening action, and determining the blinking action and determining the mouth opening action are described respectively.

I. Determine, in response to the facial feature part being the eye and the ratio reaching a first distance threshold, that the target face completes the blinking action.

Figure 5:
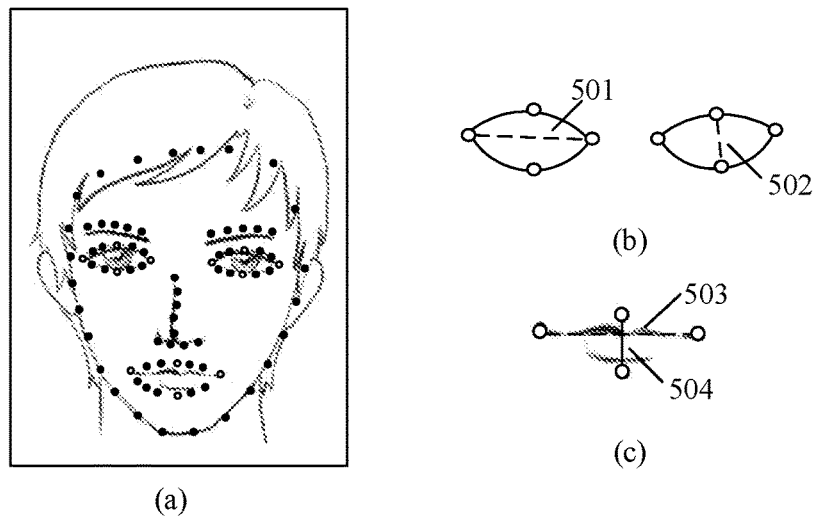
FIG. 5 is a schematic diagram of a face feature point according to an exemplary embodiment of the present disclosure.

As shown in FIG. 5(*b*), that the target face completes the blinking action is described below.

S11: Obtain a first distance and a second distance, the first distance being a distance between the left canthus feature point and the right canthus feature point, and the second distance being a distance between the upper eyelid feature point and the lower eyelid feature point.

S12: Calculate a distance ratio between the first distance and the second distance.

In one embodiment, the distance ratio includes a ratio of a first distance 501 to a second distance 502, or a ratio of the second distance 502 to the first distance 501. An example in which the ratio of the first distance 501 to the second distance 502 is calculated. The same eye includes the first distance 501 and the second distance 502. In this embodiment, only for clear marking, the first distance 501 and the second distance 502 are marked on two eyes separately.

S13: Calculate a mean value of the distance ratios of two eyes on the target face.

In an example, a distance ratio of a left eye of the target face is a1, a distance ratio of a right eye is a3, and a mean value of a1 and a2 is calculated.

S14: Determine, in response to the mean value being greater than the first distance threshold, that the target face completes the blinking action.

In one embodiment, the first distance threshold may be a default setting, or may be a distance threshold dynamically adjusted according to different target faces. For example, a first distance threshold of an adult face is greater than a first distance threshold of a child face.

S15: Determine, in response to the mean value being less than the first distance threshold, that the target face does not complete the blinking action.

If the distance ratio is a ratio of the first distance to the second distance, the mean value of the distance ratios needs to be greater than the first distance threshold; and if the distance ratio is a ratio of the second distance to the first distance, the mean value of the distance ratios needs to be less than the first distance threshold.

S16: Obtain a first frame quantity of video frames including the target action.

S17: In response to the first frame quantity of the video frames being less than the first preset threshold, filter out the n groups of video frames. For example, the n groups of video frames are deleted and/or identified as failed liveness detection.

If the quantity of video frames including actions such as blinking or mouth opening is less than the first preset threshold, the video frame is rejected in advance. The first liveness detection function outputs a video frame including the target action.

S18: Determine, in response to the first frame quantity of the video frames being greater than the first preset threshold, that the n groups of video frames are positive sample video frames.

The positive sample video frame means that the video frame is a video frame including a live face, and is opposite to an attack sample video frame. The first liveness detection function recognizes the video frame including the live face, and the video frame can be used as a sample video frame for subsequent training of the neural network model in the first liveness detection function.

Step S14 may be further implemented as the following step 14 instead:

Step 14: Determine, in response to the facial feature part being the eye and the ratio being recognized by a first classifier as a first type, that the target face completes the blinking action.

In one embodiment, the first liveness detection function further includes at least one of the first classifier or a second classifier.

In one embodiment, the foregoing ratio may alternatively be recognized by using the first classifier. The first classifier is a machine learning model such as a support vector machine having a capability to recognize the distance ratio of the facial feature points. Exemplarily, the first type is a type corresponding to the blinking action. The first classifier classifies inputted distance ratios into the type corresponding to the blinking action (that is, the first type) and a type corresponding to an unblinking action.

II. Determine, in response to the facial feature part being the mouth and the ratio reaching a second distance threshold, that the target face completes the mouth opening action.

As shown in FIG. 5(*c*), that the target face completes the mouth opening action is described below.

S21: Obtain a third distance and a fourth distance, the third distance being a distance between the feature point of the left corner of the mouth and the feature point of the right corner of the mouth, and the fourth distance being a distance between an intermediate feature point of the upper lip and an intermediate feature point of the lower lip (the feature points are shown in white dots).

S22: Calculate a distance ratio between the third distance and the fourth distance.

In one embodiment, the distance ratio includes a ratio of a third distance 503 to a fourth distance 504, or a ratio of the fourth distance 504 to the third distance 503. The ratio of the third distance 503 to the fourth distance 504 is used as an example in this embodiment.

S23: Determine, in response to the distance ratio being less than the second distance threshold, that the target face completes the mouth opening action.

In one embodiment, the second distance threshold may be a default setting, or may be a distance threshold dynamically adjusted according to different target faces. For example, a second distance threshold of a face of a man is greater than a second distance threshold of a face of a woman.

If the distance ratio is a ratio of the third distance to the fourth distance, a mean value of the distance ratios needs to be less than the second distance threshold. If the distance ratio is a ratio of the fourth distance to the third distance, a mean value of the distance ratios needs to be greater than the second distance threshold.

S24: Determine, in response to the distance ratio being greater than the second distance threshold, that the target face does not complete the mouth opening action.

S25: Obtain a second frame quantity of video frames conforming to depth information corresponding to the live face.

S26: In response to the second frame quantity of the video frames being less than a second preset threshold, filter out the n groups of video frames.

If in inputted video frames, the quantity of video frames conforming to the depth information corresponding to the live face is less than the second preset threshold, the video frame is rejected in advance.

S27: Determine, in response to the second frame quantity of the video frames being greater than the second preset threshold, that then groups of video frames are positive sample video frames.

The positive sample video frame means that the video frame is a video frame including a live face, and is opposite to an attack sample video frame. A second liveness detection function recognizes the video frame including the live face, and the video frame can be used as a sample video frame for subsequent training of the second liveness detection function.

Step S23 may be further implemented as the following step 23 instead:

Step 23: Determine, in response to the facial feature part being the mouth and the ratio being recognized by a second classifier as a second type, that the target face completes the mouth opening action.

In one embodiment, the foregoing ratio may alternatively be recognized by using the second classifier. The second classifier is a machine learning model such as a support vector machine having a capability to recognize the distance ratio of the facial feature points. Exemplarily, the second type is a type corresponding to the mouth opening action. The second classifier classifies inputted distance ratios into the type corresponding to the mouth opening action (that is, the second type) and a type corresponding to a mouth opening action not being performed.

Step 404: Invoke the second liveness detection function to recognize the depth video frames in the n groups of video frames, the second liveness detection function being a 3D structured-light liveness detection function.

Step 405: Determine, in response to both detection results of the first liveness detection function and the second liveness detection function indicating that a type of the target face being a liveness type, that the target face is a live target face.

When a detection result of at least one liveness detection function is not a liveness type, an outputted detection result is that the target face is a non-live target face.

This step includes the following substeps:

Step 4051: Obtain the first frame quantity and the second frame quantity, the first frame quantity being a quantity of color video frames including the target action and recognized by the first liveness detection function, and the second frame quantity being a quantity of depth video frames recognized by the second liveness detection function and conforming to the depth information corresponding to the live face.

Step 4052: Determine, in response to the first frame quantity being greater than the first preset threshold and the second frame quantity being greater than the second preset threshold, that the target face is the live target face.

When both results of the first liveness detection function and the second liveness detection function indicate that a face in the video frame is the live face, the quantity of video frames including the live face is greater than the first preset threshold, and the quantity of video frames conforming to the depth information corresponding to the live face is greater than the second preset threshold, it is determined that the target face is the live target face.

It may be understood that the liveness detection function in the foregoing embodiment may be by any neural network.

Based on the above, in the method provided in this embodiment, the first liveness detection function and the second liveness detection function are combined, and the distance ratio of the facial feature points is calculated to determine whether the target face completes the target action. There is no need to mark an action, and there is no need to record a time required for each action, which reduces the difficulty of data acquisition and causes the first liveness detection function to be easily trained. The first liveness detection function can resist a copy attack and a mask attack, and the second liveness detection function can resist a synthetic attack and the copy attack, which can protect user information security more comprehensively.

Before the first liveness detection function and the second liveness detection function unit recognize a video frame, it is necessary to determine whether the video frame includes a face.

Figure 6:
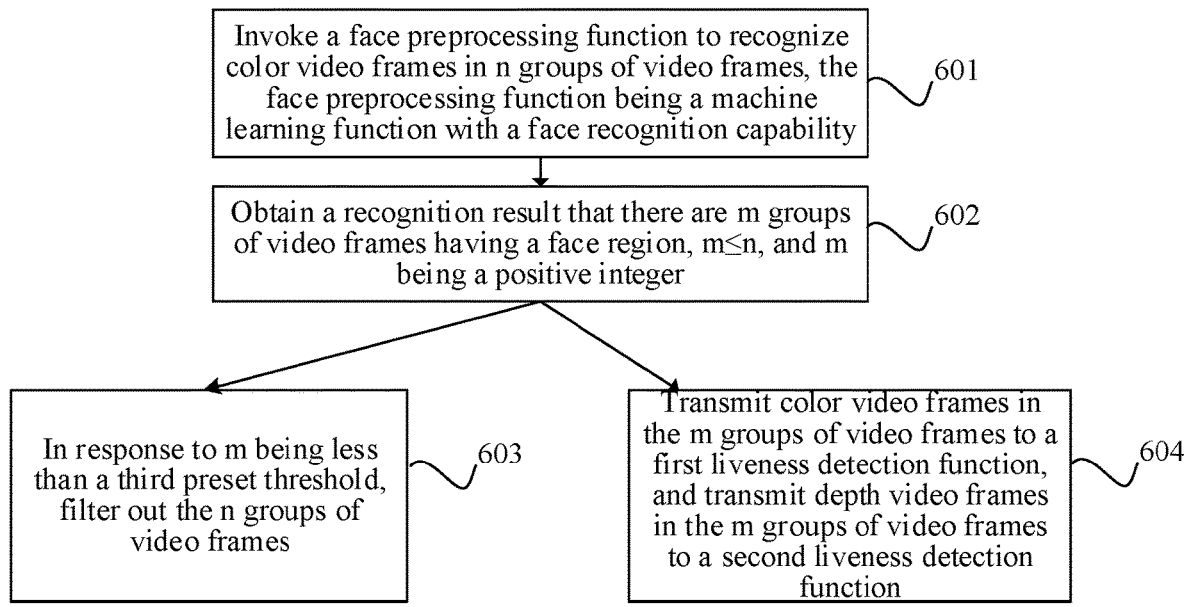
FIG. 6 is a flowchart of an AI-based face recognition method with reference to a face preprocessing process according to an exemplary embodiment of the present disclosure.

FIG. 6 shows an AI-based face recognition method with reference to a face preprocessing process according to an exemplary embodiment of the present disclosure. The method is applicable to the terminal 120 in the computer system shown in FIG. 2 or another computer system. The method includes the following steps:

Step 601: Invoke a face preprocessing function to recognize color video frames in n groups of video frames, the face preprocessing function being a machine learning function with a face recognition capability.

Figure 7:
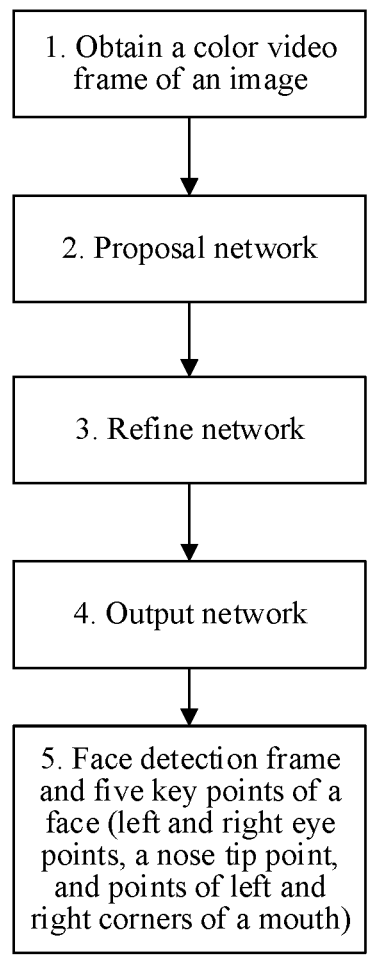
FIG. 7 is a flowchart of performing face detection by using a multi-task convolutional neural network (MTCNN) algorithm according to an exemplary embodiment of the present disclosure.

In one embodiment, the face preprocessing function may be a MTCNN. The MTCNN is cascaded by three sub-networks, including a proposal network (P-Net), a refine network (R-Net), and an output network (O-Net). FIG. 7 is a flowchart of a method for detecting a facial feature point by using an MTCNN according to an exemplary embodiment of the present disclosure.

The method includes the following steps:

Step 1: Obtain a color video frame of an image.

Step 2: A P-Net uses the color video frame of the image as an input, to generate a series of candidate regions that may include a face.

Step 3: An R-Net refines a large quantity of candidate regions generated by the P-Net, and filters out the regions that do not include the face.

Step 4: An O-Net outputs a face region and positions a facial feature point.

Exemplarily, the facial feature points include left and right eye feature points, a nose tip feature point, and feature points of left and right corners of a mouth.

Step 5: Obtain a face detection frame and the facial feature point.

Step 602: Obtain a recognition result that there are m groups of video frames having the face region, m≤n, and m being a positive integer.

The O-Net outputs the m groups of video frames having the face region. The m groups of video frames may be as many as the n groups of input video frames, or less than the n groups of input video frames. The O-Net positions the facial feature point on the face and outputs position coordinates of the facial feature point.

Step 603: In response to m being less than a third preset threshold, filter out the n groups of video frames.

If the quantity of video frames m including the face region in the inputted video frames does not exceed the third preset threshold, then groups of video frames are rejected in advance.

Step 604: Transmit color video frames in the m groups of video frames to a first liveness detection function, and transmit depth video frames in the m groups of video frames to a second liveness detection function.

The pre-processed video frames are respectively transmitted to the first liveness detection function and the second liveness detection function. The first liveness detection function recognizes the color video frames, and the second liveness detection function recognizes the depth video frames.

Figure 8:
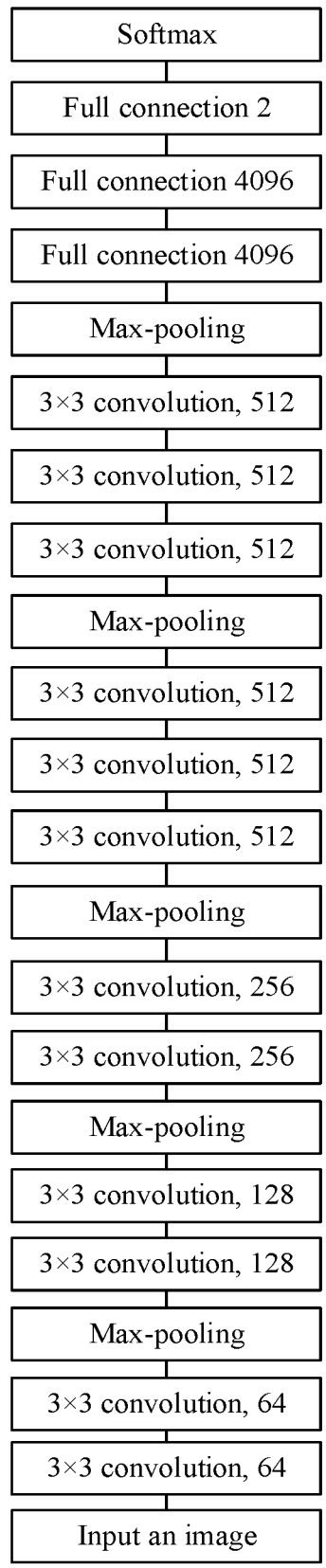
FIG. 8 is a structural block diagram of a VGG-16 deep learning network according to an exemplary embodiment of the present disclosure.

In one embodiment, whether the inputted depth video frame is a real live face is determined by training a binary deep learning model. Exemplarily, the binary deep learning model is a VGG-16 deep learning network. A structure of the VGG-16 deep learning network is shown in FIG. 8.

3×3 represents a size of a convolution kernel, a number after the term "convolution" represents the quantity of output channels, and a number in a full connection layer is the quantity of output channels.

The depth video frame is first scaled to a size of 224×224 (pixels), and then the scaled video frame is used as an input of the VGG-16 deep learning network. After a series of operations such as convolution, rectified linear activation (ReLU activation), fully connection, and a normalization exponential (softmax) operation on network layers, a deep learning network outputs a probability whether the inputted video frame is a live person or an attack sample.

It may be understood that the deep learning network in the foregoing embodiment may be by any neural network.

Based on the above, in the method provided in this embodiment, before the first liveness detection function and the second liveness detection function detect the video frames, the video frames are recognized by using the face preprocessing function, and part of the video frames that do not include a face in the video frames are filtered out, thereby improving the accuracy of the two liveness detection functions in detecting the live face, and also improving the detection efficiency of the live face.

The following describes an entire process of recognizing a live face in a video frame by using a live face detection system. An example in which a first liveness detection function is an interactive liveness detection model, a second liveness detection function is a 3D structured-light detection model, and a face preprocessing function is a face detection preprocessing model is used for description.

Figure 9:
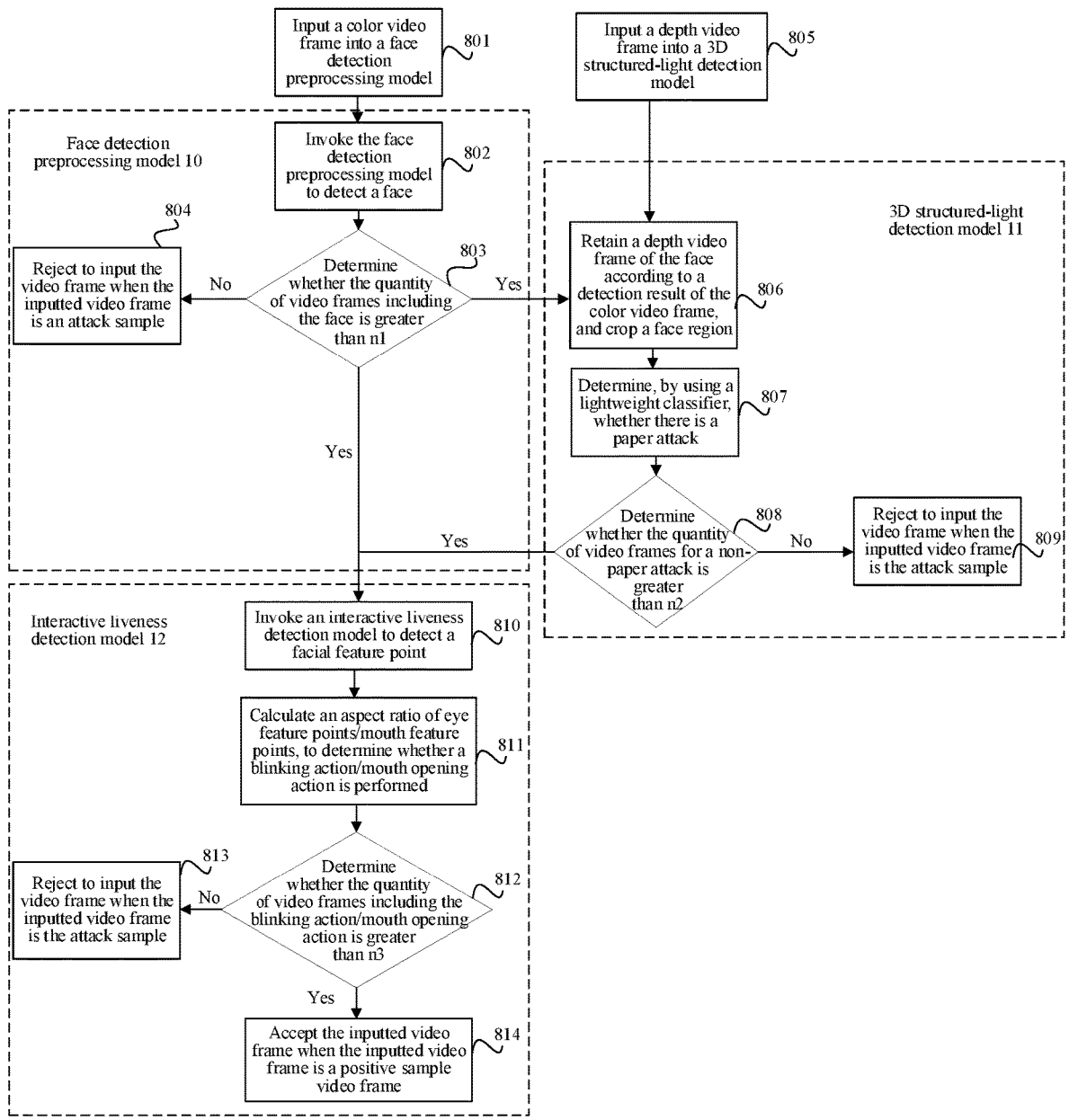
FIG. 9 is a flowchart of an AI-based face recognition method with reference to a live face detection system according to an exemplary embodiment of the present disclosure.

FIG. 9 shows an AI-based face recognition method according to an exemplary embodiment of the present disclosure. The method is applicable to the terminal 120 in the computer system shown in FIG. 2 or another computer system. The method includes the following steps:

Step 801: Input a color video frame into a face detection preprocessing model.

Step 802: Invoke the face detection preprocessing model to detect a face.

Step 803: Determine whether the quantity of video frames including the face is greater than n1.

Whether the inputted video frame includes the face is determined by using a face detection preprocessing model 10. If the quantity of video frames including the face is greater than n1 (a third preset threshold), step 806 and step 810 are performed; and otherwise, step 804 is performed.

Step 804: Reject to input the video frame when the inputted video frame is an attack sample.

Step 805: Input a depth video frame into a 3D structured-light detection model.

A 3D structured-light detection model 11 detects the depth video frame in the video frames.

Step 806: Retain a depth video frame of the face according to a detection result of the color video frame, and crop a face region.

The 3D structured-light detection model 11 can determine the face region in the depth video frame.

Step 807: Determine, by using a lightweight classifier, whether there is a paper attack.

The paper attack is an attack formed by a face on a flat-shaped medium, for example, a sample attack formed by a face on a photo, a screen image, an identification card, and a newspaper. That is, the lightweight classifier can be used to determine whether a target face is a face having a 3D structure.

Step 808: Determine whether the quantity of video frames for a non-paper attack is greater than n2.

If the quantity of video frames for the non-paper attack is greater than n2 (a second preset threshold), step 810 is performed; and otherwise, step 809 is performed.

Step 809: Reject to input the video frame when the inputted video frame is the attack sample.

Step 810: Invoke an interactive liveness detection model to detect a facial feature point.

Step 811: Calculate an aspect ratio of eye feature points or mouth feature points, to determine whether a blinking action or a mouth opening action is performed.

The aspect ratio of the eye feature points or the mouth feature points is a distance ratio. In one embodiment, the target face may also perform actions such as head turning or nodding.

Step 812: Determine whether the quantity of video frames including the blinking action or the mouth opening action is greater than n3.

The facial feature point of the target face is determined by using an interactive liveness detection model 12, and whether the target face completes a target action is determined through movement changes of the facial feature point. An example in which the target action includes the blinking action or the mouth opening action is used. If the quantity of video frames including the blinking action or the mouth opening action is greater than n3 (a first preset threshold), step 814 is performed; and otherwise, step 813 is performed.

Step 813: Reject to input the video frame when the inputted video frame is the attack sample.

Step 814: Accept the inputted video frame when the inputted video frame is a positive sample video frame.

The positive sample video frame includes a live face, and the positive sample video frame may be used as a training sample for training a neural network model in a first liveness detection function.

It may be understood that the deep neural network in the foregoing embodiment may be by any neural network.

Based on the above, in the method provided in this embodiment, the first liveness detection function and the second liveness detection function are combined, and the distance ratio of the facial feature points is calculated to determine whether the target face completes the target action. Whether the target face is a paper attack is determined according to depth information of the target face. When both detection results of the two liveness detection functions indicate that the target face in the video frame is a liveness type, the video frame includes a live target face. The first liveness detection function can resist a copy attack and a mask attack, and the second liveness detection function can resist a synthetic attack and the copy attack, which can protect user information security more comprehensively.

Figure 10:
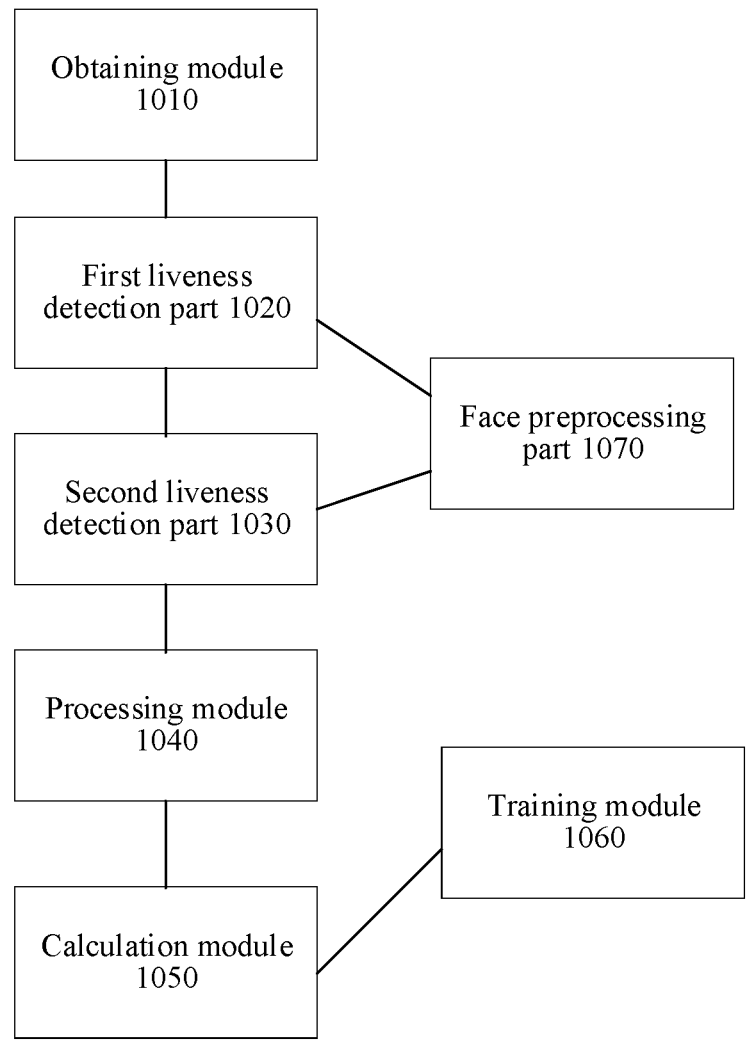
FIG. 10 is a structural block diagram of an AI-based face recognition apparatus according to an exemplary embodiment of the present disclosure.

FIG. 10 is a block diagram of an AI-based face recognition apparatus according to an exemplary embodiment of the present disclosure. The apparatus includes:

an obtaining module 1010, configured to obtain n groups of input video frames, at least one group of video frames including a color video frame and a depth video frame of a target face, n being a positive integer;

a first liveness detection function 1020, configured to recognize the color video frames in the n groups of video frames, the first liveness detection function being an interactive liveness detection function;

a second liveness detection function 1030, configured to recognize the depth video frames in the n groups of video frames, the second liveness detection function being a 3D structured-light liveness detection function; and a processing module 1040, configured to determine, in response to both detection results of the first liveness detection function and the second liveness detection function indicating that a type of the target face being a liveness type, that the target face is a live target face.

In some embodiments, the first liveness detection function 1020 is configured to invoke a neural network model in the first liveness detection function to obtain a position of a facial feature point on the color video frame.

The first liveness detection function 1020 is configured to determine, according to a distance between the facial feature points on the color video frame, whether the target face completes a target action.

In some embodiments, the apparatus includes a calculation module 1050.

The calculation module 1050 is configured to invoke the first liveness detection function to calculate a ratio of a maximum horizontal distance to a maximum longitudinal distance between the facial feature points belonging to a same facial feature part, the facial feature part including at least one of an eye or a mouth.

The processing module 1040 is configured to determine, in response to the ratio reaching a preset condition, that the target face completes the target action.

In some embodiments, the processing module 1040 is configured to determine, in response to the facial feature part being the eye and the ratio reaching a first distance threshold, that the target face completes the blinking action; and determine, in response to the facial feature part being the mouth and the ratio reaching a second distance threshold, that the target face completes the mouth opening action.

In some embodiments, the facial feature points include an eye feature point, and the eye feature point includes a left canthus feature point, a right canthus feature point, an upper eyelid feature point, and a lower eyelid feature point.

The obtaining module 1010 is configured to obtain a first distance and a second distance, the first distance being a distance between the left canthus feature point and the right canthus feature point, and the second distance being a distance between the upper eyelid feature point and the lower eyelid feature point.

The calculation module 1050 is configured to calculate a distance ratio between the first distance and the second distance.

The calculation module 1050 is configured to calculate a mean value of the distance ratios of two eyes on the target face; and determine, in response to the mean value being greater than the first distance threshold, that the target face completes the blinking action.

In some embodiments, the first liveness detection function 1020 further includes at least one of a first classifier and a second classifier. The processing module 1040 is configured to determine, in response to the facial feature part being the eye and the ratio being recognized by a first classifier as a first type, that the target face completes the blinking action. The processing module 1040 is configured to determine, in response to the facial feature part being the mouth and the ratio being recognized by a second classifier as a second type, that the target face completes the mouth opening action.

In some embodiments, the apparatus includes a training module 1060. The neural network model is obtained through training in the following manner:

obtain a training sample set, the training sample set including a plurality of groups of sample face images and a sample facial feature point;

recognize the sample face image, to obtain a predicted facial feature point of a sample face;

compare the sample facial feature point of the sample face with the predicted facial feature point of the sample face to calculate an error loss; and train the neural network model of the first liveness detection function based on the error loss and by using an error backpropagation algorithm to obtain a trained neural network model of first liveness detection function.

In some embodiments, the apparatus includes a face preprocessing function 1070.

The face preprocessing function 1070 is configured to recognize the color video frames in the n groups of video frames, the face preprocessing function 1070 being a machine learning function with a face recognition capability.

The obtaining module 1010 is configured to obtain a recognition result that there are m groups of video frames having the face region, m≤n, and m being a positive integer.

The processing module 1040 is configured to transmit color video frames in the m groups of video frames to the first liveness detection function, and transmit depth video frames in the m groups of video frames to the second liveness detection function.

In some embodiments, the obtaining module 1010 is configured to obtain a first frame quantity and a second frame quantity, the first frame quantity being a quantity of color video frames including the target action and recognized by the first liveness detection function 1020, and the second frame quantity being a quantity of depth video frames recognized by the second liveness detection function 1030 and conforming to depth information corresponding to the live face.

The processing module 1040 is configured to determine, in response to the first frame quantity being greater than the first preset threshold and the second frame quantity being greater than the second preset threshold, that the target face is the live target face.

In some embodiments, the processing module 1040 is configured to determine, in response to the first frame quantity of the video frames being less than the first preset threshold, that the target face is a non-live target face, and filter out the n groups of video frames; or determine, in response to the second frame quantity of the video frames being less than the second preset threshold, that the target face is a non-live target face, and filter out the n groups of video frames.

In some embodiments, the processing module 1040 is configured to filter out the n groups of video frames in response to m being less than a third preset threshold.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 11:
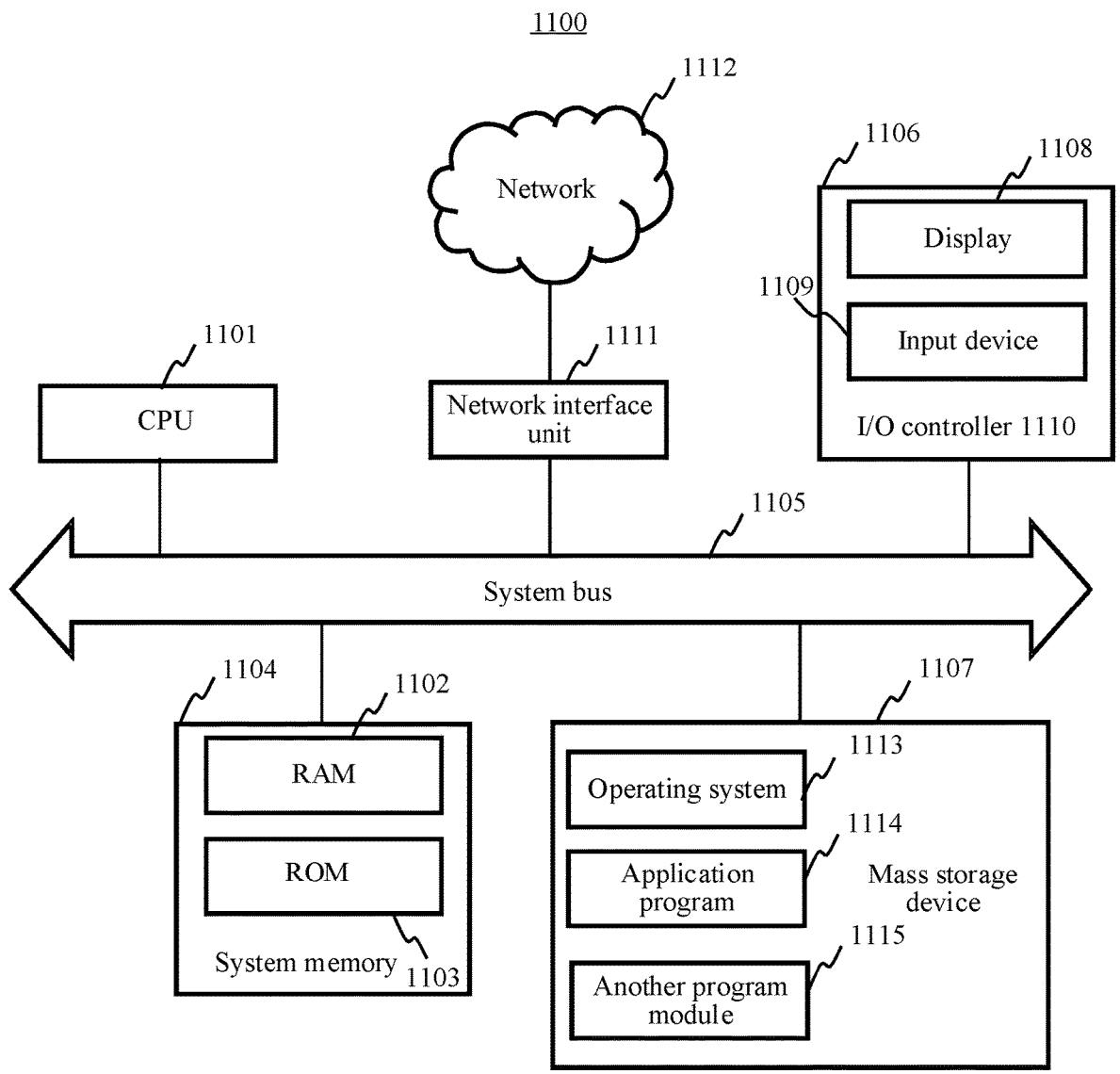
FIG. 11 is a structural block diagram of a server according to an exemplary embodiment of the present disclosure.

FIG. 11 is a schematic structural diagram of a server according to an exemplary embodiment of the present disclosure. The server may be a server in a background server cluster 140. Specifically:

A server 1100 includes a central processing unit (CPU) 1101, a random access memory (RAM) 1102, a system memory 1104 of a read only memory (ROM) 1103, and a system bus 1105 connecting the system memory 1104 to the CPU 1101. The server 1100 further includes a basic input/output (I/O) system 1106 assisting in transmitting information between devices in a computer, and a mass storage device 1107 configured to store an operating system 1113, an application program 1114 and another program module 1115.

The basic I/O system 1106 includes a display 1108 configured to display information and an input device 1109 such as a mouse or a keyboard that is used for inputting information by a user. The display 1108 and the input device 1109 are both connected to the CPU 1101 by using an input/output controller 1110 connected to the system bus 1105. The basic I/O system 1106 may further include the input and output controller 1110 to be configured to receive and process inputs from a plurality of other devices such as a keyboard, a mouse, and an electronic stylus. Similarly, the input/output controller 1110 further provides an output to a display screen, a printer or another type of output device.

The mass storage device 1107 is connected to the CPU 1101 by using a mass storage controller (not shown) connected to the system bus 1105. The mass storage device 1107 and a computer-readable medium associated with the mass storage device 1107 provide non-volatile storage for the server 1100. That is, the mass storage device 1107 may include a computer-readable medium (not shown) such as a hard disk or a compact disc read only memory (CD-ROM) drive.

The computer-readable medium may include a computer storage medium and a communication medium. The computer storage medium includes volatile and non-volatile media, and removable and non-removable media implemented by using any method or technology and configured to store information such as a computer-readable instruction, a data structure, a program module, or other data. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or a solid state drive (SSD), another optical memory, a magnetic cassette, a magnetic tape, a magnetic disk memory, or another magnetic storage device. The RAM may include a resistance random access memory (ReRAM) and a dynamic random access memory (DRAM). Certainly, a person skilled in art can know that the computer storage medium is not limited to the foregoing several types. The system memory 1104 and the mass storage device 1107 may be collectively referred to as a memory.

According to various embodiments of the present disclosure, the server 1100 may further be connected, by using a network such as the Internet, to a remote computer on the network and run. That is, the server 1100 may be connected to a network 1112 by using a network interface unit 1111 that is connected to the system bus 1105, or may be connected to a network of another type or a remote computer system (not shown) by using the network interface unit 1111.

The memory further includes one or more programs, which are stored in the memory and are configured to be executed by the CPU.

In some embodiments, a computer device is provided, including a processor and a memory, the memory storing at least one instruction, at least one program, a code set or an instruction set, and the at least one instruction, the at least one program, the code set or the instruction set being loaded and executed by the processor to implement the foregoing AI-based face recognition method.

In some embodiments, a computer-readable storage medium is provided, storing at least one instruction, at least one program, a code set or an instruction set, and the at least one instruction, the at least one program, the code set or the instruction set being loaded and executed by a processor to implement the foregoing AI-based face recognition method.

Figure 12:
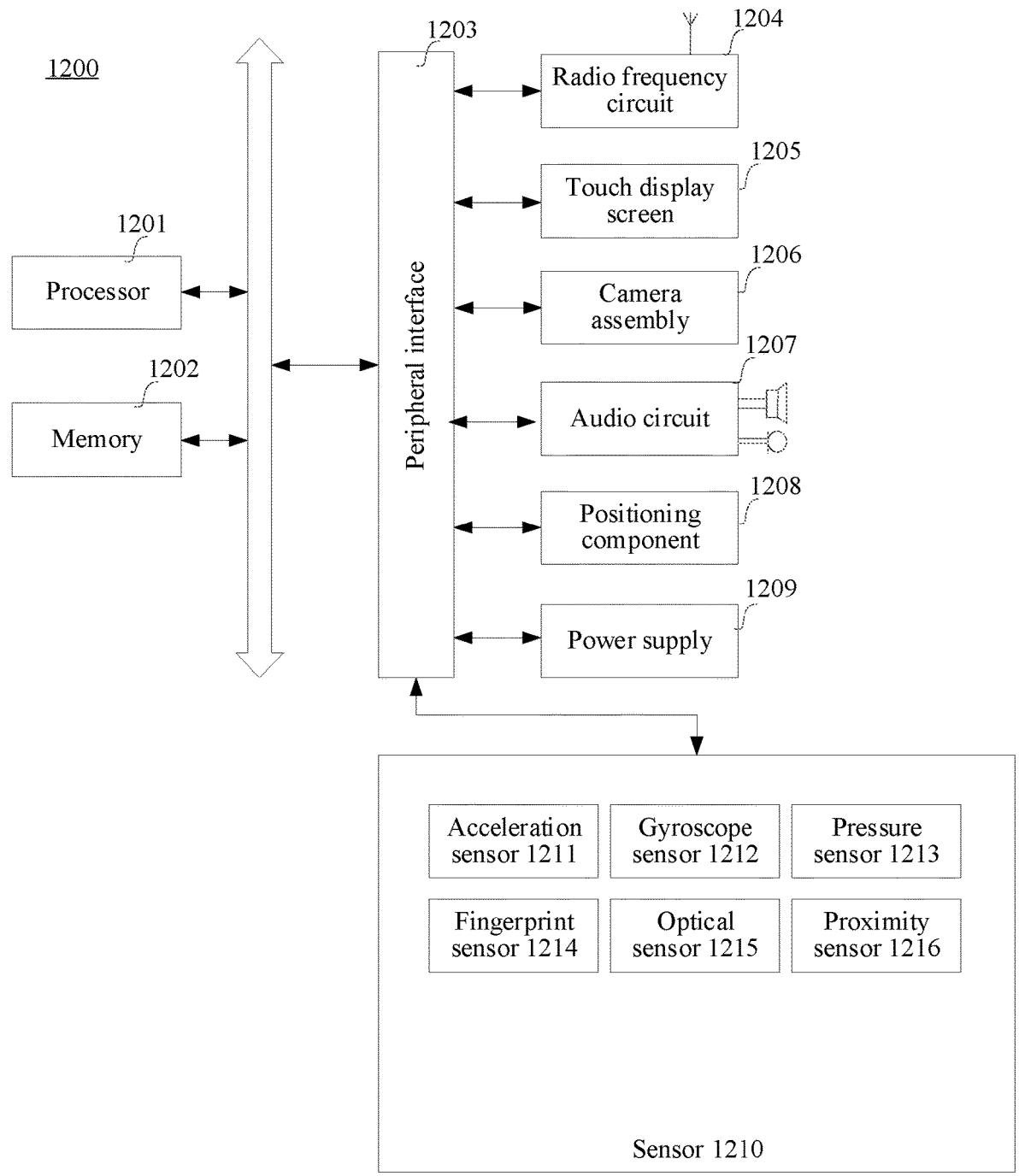
FIG. 12 is a schematic structural diagram of a computer device according to an exemplary embodiment of the present disclosure.

FIG. 12 is a structural block diagram of a computer device 1200 according to an exemplary embodiment of the present disclosure. The computer device 1200 may be a portable mobile terminal, for example, a smartphone, a tablet computer, an MP3 player, or an MP4 player. The computer device 1200 may be further referred to as other names such as user equipment and a portable terminal.

Generally, the computer device 1200 includes a processor 1201 and a memory 1202.

The processor 1201 may include one or more processing cores, for example, a 4-core processor or an 8-core processor. The processor 1201 may be implemented in at least one hardware form of digital signal processing (DSP), a field programmable gate array (FPGA), or a programmable logic array (PLA). The processor 1201 may alternatively include a main processor and a coprocessor. The main processor is configured to process data in an active state, also referred to as a CPU. The coprocessor is a low-power processor configured to process data in a standby state. In some embodiments, the processor 1201 may be integrated with a graphics processing unit (GPU). The GPU is configured to render and draw content that needs to be displayed on a display. In some embodiments, the processor 1201 may further include an AI processor. The AI processor is configured to process computing operations related to machine learning.

The memory 1202 may include one or more computer-readable storage media. The computer-readable storage medium may be tangible and non-transient. The memory 1202 may further include a high-speed random access memory, and a non-volatile memory such as one or more magnetic disk storage devices and a flash storage device. In some embodiments, the non-transitory computer-readable storage medium in the memory 1202 is configured to store at least one instruction, the at least one instruction being configured to be executed by the processor 1201 to implement the AI-based face recognition method provided in the present disclosure.

In some embodiments, the computer device 1200 may further include a peripheral interface 1203 and at least one peripheral. Specifically, the peripheral includes: at least one of a radio frequency (RF) circuit 1204, a touch display screen 1205, a camera assembly 1206, an audio circuit 1207, a positioning component 1208, or a power supply 1209.

The peripheral interface 1203 may be configured to connect at least one peripheral related to I/O to the processor 1201 and the memory 1202. In some embodiments, the processor 1201, the memory 1202, and the peripheral interface 1203 are integrated on the same chip or the same circuit board. In some other embodiments, any or both of the processor 1201, the memory 1202, and the peripheral interface 1203 may be implemented on an independent chip or circuit board. This is not limited in this embodiment.

The RF circuit 1204 is configured to receive and transmit an RF signal, which is also referred to as an electromagnetic signal. The RF circuit 1204 communicates with a communication network and another communication device by using the electromagnetic signal. The RF circuit 1204 converts an electric signal into an electromagnetic signal for transmission, or converts a received electromagnetic signal into an electric signal. In one embodiment, the RF circuit 1204 includes: an antenna system, an RF transceiver, one or more amplifiers, a tuner, an oscillator, a digital signal processor, a codec chip set, a subscriber identity module card, and the like. The RF circuit 1204 may communicate with another terminal by using at least one wireless communication protocol. The wireless communication protocol includes, but is not limited to: a world wide web, a metropolitan area network, an intranet, generations of mobile communication networks (2G, 3G, 4G, and 5G), a wireless local area network, and/or a Wi-Fi network. In some embodiments, the RF 1204 may further include a circuit related to near field communication (NFC), which is not limited in the present disclosure.

The touch display screen 1205 is configured to display a user interface (UI). The UI may include a graph, text, an icon, a video, and any combination thereof. The touch display screen 1205 also has a capability of collecting a touch signal on or above a surface of the touch display screen 1205. The touch signal may be inputted, as a control signal, to the processor 1201 for processing. The touch display screen 1205 is configured to provide a virtual button and/or a virtual keyboard, which is also referred to as a soft button and/or a soft keyboard. In some embodiments, there may be one touch display screen 1205, disposed on a front panel of the computer device 1200. In some other embodiments, there may be at least two touch display screens 1205, disposed on different surfaces of the computer device 1200 respectively or in a folded design. In still other embodiments, the touch display screen 1205 may be a flexible display screen, disposed on a curved surface or a folded surface of the computer device 1200. Even, the touch display screen 1205 may be further set in a non-rectangular irregular pattern, namely, a special-shaped screen. The touch display screen 1205 may be made of a material such as a liquid crystal display (LCD) or an organic light-emitting diode (OLED).

The camera component 1206 is configured to acquire an image or a video. In one embodiment, the camera assembly 1206 includes a front-facing camera and a rear-facing camera. Generally, the front-facing camera is configured to implement a video call or self-portrait. The rear-facing camera is configured to shoot a picture or a video. In some embodiments, there are at least two rear-facing cameras, each of which is any one of a main camera, a depth of field camera and a wide-angle camera, to implement a background blurring function by fusing the main camera and the depth of field camera, and panoramic shooting and virtual reality (VR) shooting functions by fusing the main camera and the wide-angle camera. In some embodiments, the camera assembly 1206 may further include a flash. The flash may be a single color temperature flash or a double color temperature flash. The double color temperature flash is a combination of a warm light flash and a cold light flash, and may be used for light compensation under different color temperatures.

The audio circuit 1207 is configured to provide an audio interface between a user and the computer device 1200. The audio circuit 1207 may include a microphone and a speaker. The microphone is configured to acquire sound waves of users and surroundings, and convert the sound waves into electrical signals and input the signals to the processor 1201 for processing, or input the signals to the RF circuit 1204 to implement voice communication. For the purpose of stereo sound collection or noise reduction, there may be a plurality of microphones, respectively disposed at different parts of the computer device 1200. The microphone may be further a microphone array or an omnidirectional collection microphone. The speaker is configured to convert electric signals from the processor 1201 or the RF circuit 1204 into sound waves. The speaker may be a conventional thin-film speaker or a piezoelectric ceramic speaker. When the speaker is the piezoelectric ceramic speaker, the speaker cannot only convert an electrical signal into sound waves audible to a human being, but also convert an electrical signal into sound waves inaudible to the human being for ranging and other purposes. In some embodiments, the audio circuit 1207 may further include an earphone jack.

The positioning component 1208 is configured to determine a current geographic location of the computer device 1200 through positioning, to implement navigation or a location based service (LBS). The positioning assembly 1208 may be a positioning assembly based on the Global Positioning System (GPS) of the United States, the BeiDou system of China, or the GALILEO System of the European Union.

The power supply 1209 is configured to supply power to components in the computer device 1200. The power supply 1209 may be an alternating current, a direct current, a primary battery, or a rechargeable battery. When the power supply 1209 includes a rechargeable battery, the rechargeable battery may be a wired rechargeable battery or a wireless rechargeable battery. The wired charging battery is a battery charged through a wired line, and the wireless charging battery is a battery charged through a wireless coil. The rechargeable battery may be further configured to support a quick charge technology.

In some embodiments, the computer device 1200 may further include one or more sensors 1210. The one or more sensors 1210 include, but are not limited to: an acceleration sensor 1211, a gyroscope sensor 1212, a pressure sensor 1213, a fingerprint sensor 1214, an optical sensor 1215, and a proximity sensor 1216.

The acceleration sensor 1211 may detect accelerations on three coordinate axes of a coordinate system established by the computer device 1200. For example, the acceleration sensor 1211 may be configured to detect components of the gravity acceleration on the three coordinate axes. The processor 1201 may control, according to a gravity acceleration signal acquired by the acceleration sensor 1211, the touch display screen 1205 to display the user interface in a frame view or a portrait view. The acceleration sensor 1211 can further be configured to detect motion data of a game or a user.

The gyroscope sensor 1212 may detect a body direction and a rotation angle of the computer device 1200. The gyroscope sensor 1212 may acquire a 3D action of the user on the computer device 1200 together with the acceleration sensor 1211. The processor 1201 may implement the following functions according to data acquired by the gyroscope sensor 1212: motion sensing (for example, the UI is changed according to a tilt operation of a user), image stabilization during shooting, game control, and inertial navigation.

The pressure sensor 1213 may be disposed on a side frame of the computer device 1200 and/or a lower layer of the touch display screen 1205. When the pressure sensor 1213 is disposed at the side frame of the computer device 1200, a holding signal of the user on the computer device 1200 may be detected, and left/right hand identification and a quick operation may be performed according to the holding signal. When the pressure sensor 1213 is disposed at the lower layer of the touch display screen 1205, an operable control on the UI interface can be controlled according to a pressure operation of the user on the touch display screen 1205. The operable control includes at least one of a button control, a scroll-bar control, an icon control, and a menu control.

The fingerprint sensor 1214 is configured to acquire a fingerprint of a user to identify the identity of the user according to the acquired fingerprint. When identifying that the identity of the user is a trusted identity, the processor 1201 authorizes the user to perform related sensitive operations. The sensitive operations include: unlocking a screen, viewing encrypted information, downloading software, paying, changing a setting, and the like. The fingerprint sensor 1214 may be disposed on a front face, a back face, or a side face of the computer device 1200. When a physical button or a vendor logo is disposed on the computer device 1200, the fingerprint sensor 1214 may be integrated together with the physical button or the vendor logo.

The optical sensor 1215 is configured to acquire ambient light intensity. In an embodiment, the processor 1201 may control display luminance of the touch display screen 1205 according to the ambient light intensity acquired by the optical sensor 1215. Specifically, when the ambient light intensity is relatively high, the display brightness of the touch display screen 1205 is turned up. When the ambient light intensity is relatively low, the display brightness of the touch display screen 1205 is turned down. In another embodiment, the processor 1201 may further dynamically adjust a camera parameter of the camera component 1206 according to the ambient light intensity collected by the optical sensor 1215.

The proximity sensor 1216, also referred to as a distance sensor, is usually disposed on the front panel of the computer device 1200. The proximity sensor 1216 is configured to acquire a distance between a front face of the user and the front face of the computer device 1200. In an embodiment, when the proximity sensor 1216 detects that the distance between the user and the front surface of the computer device 1200 gradually becomes small, the touch display screen 1205 is controlled by the processor 1201 to switch from a screen-on state to a screen-off state. When the proximity sensor 1216 detects that the distance between the user and the front surface of the computer device 1200 gradually becomes large, the touch display 1201 is controlled by the processor 1205 to switch from the screen-off state to the screen-on state.

A person skilled in the art may understand that the structure shown in FIG. 12 does not constitute any limitation on the computer device 1200, and the computer device may include more components or fewer components than those shown in the figure, or some components may be combined, or a different component deployment may be used.

According to an aspect of the embodiments of the present disclosure, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, so that the computer device performs the AI-based face recognition method provided in the foregoing various implementations.

What is claimed is:

1. An artificial intelligence (AI)-based face recognition method, applicable to a computer device, the method comprising:
   obtaining n groups of input video frames, at least one group of video frames comprising a color video frame and a depth video frame of a target face, n being a positive integer;
   invoking an interactive liveness detection function to recognize the color video frames in the n groups of video frames, comprising:
      invoking a neural network model in the interactive liveness detection function to obtain a position of a facial feature point on each of the color video frames; and
      invoking the interactive liveness detection function to determine, according to a distance between the facial feature points of the color video frames, whether the target face completes a target action;
   invoking a second three-dimensional (3D) structured-light liveness detection function to recognize the depth video frames in the n groups of video frames; and
   determining, in response to both detection results of the interactive liveness detection function and the 3D structured-light liveness detection function indicating that a type of the target face being a liveness type, that the target face is a live target face,
   wherein the neural network model is obtained by:
      obtaining a training sample set, the training sample set comprising a plurality of groups of sample face images and sample facial feature points;
      invoking the interactive liveness detection function to recognize a sample face image of the plurality of groups of sample face images, to obtain a predicted facial feature point of a sample face;
      comparing a sample facial feature point, of the sample facial feature points, corresponding to the sample face with the predicted facial feature point of the sample face to calculate an error loss; and
      training the neural network model of the interactive liveness detection function based on the error loss and by using an error backpropagation algorithm to obtain a trained neural network model of the interactive liveness detection function.

2. The method according to claim 1, wherein the invoking the interactive liveness detection function to determine, according to a distance between the facial feature points on the color video frames, whether the target face completes a target action comprises:
   invoking the interactive liveness detection function to calculate a ratio of a maximum horizontal distance to a maximum longitudinal distance between the facial feature points belonging to a same facial feature part, the same facial feature part comprising at least one of an eye or a mouth; and determining, in response to the ratio reaching a preset condition, that the target face completes the target action.

3. The method according to claim 2, wherein the determining, in response to the ratio reaching a preset condition, that the target face completes the target action comprises:

determining, in response to the facial feature part being the eye and the ratio reaching a first distance threshold, that the target face completes a blinking action; and determining, in response to the facial feature part being the mouth and the ratio reaching a second distance threshold, that the target face completes a mouth opening action.

4. The method according to claim 3, wherein the facial feature points comprise an eye feature point, and the eye feature point comprises a left canthus feature point, a right canthus feature point, an upper eyelid feature point, and a lower eyelid feature point; and the determining, in response to the facial feature part being the eye and the ratio reaching a first distance threshold, that the target face completes a blinking action comprises:

obtaining a first distance and a second distance, the first distance being a distance between the left canthus feature point and the right canthus feature point, and the second distance being a distance between the upper eyelid feature point and the lower eyelid feature point;

calculating a distance ratio between the first distance and the second distance;

calculating a mean value of the distance ratios of two eyes on the target face; and determining, in response to the mean value being greater than the first distance threshold, that the target face completes the blinking action.

5. The method according to claim 2, wherein the interactive liveness detection function further comprises: at least one of a first classifier or a second classifier, and the determining, in response to the ratio reaching a preset condition, that the target face completes the target action comprises:

determining, in response to the facial feature part being the eye and the ratio being recognized by the first classifier as a first type, that the target face completes a blinking action; and determining, in response to the facial feature part being the mouth and the ratio being recognized by the second classifier as a second type, that the target face completes a mouth opening action.

6. The method according to claim 1, further comprising:

invoking a face preprocessing function to recognize the color video frames in the n groups of video frames, the face preprocessing function being a machine learning function with a face recognition capability;

obtaining a recognition result that there are m groups of video frames having a face region, m≤n, and m being a positive integer; and providing color video frames in the m groups of video frames to the interactive liveness detection function, and providing depth video frames in the m groups of video frames to the 3D structured-light liveness detection function.

7. The method according to claim 6, further comprising:

in response to m being less than a third preset threshold, filtering out the n groups of video frames.

8. The method according to claim 1, wherein the determining, in response to both detection results of the interactive liveness detection function and the 3D structured-light liveness detection function indicating that a type of the target face being a liveness type, that the target face is a live target face comprises:

obtaining a first frame quantity and a second frame quantity, the first frame quantity being a quantity of color video frames comprising the target action and recognized by the interactive liveness detection function, and the second frame quantity being a quantity of depth video frames recognized by the 3D structured-light liveness detection function and conforming to depth information corresponding to the live face; and determining, in response to the first frame quantity being greater than a first preset threshold and the second frame quantity being greater than a second preset threshold, that the target face is the live target face.

9. The method according to claim 8, further comprising:

determining, in response to the first frame quantity of the video frames being less than the first preset threshold, that the target face is a non-live target face, and filtering out the n groups of video frames;

or, determining, in response to the second frame quantity of the video frames being less than the second preset threshold, that the target face is a non-live target face, and filtering out the n groups of video frames.

10. An artificial intelligence (AI)-based face recognition apparatus, comprising a processor and a memory, the memory storing one or more computer programs, the processor being configured to load and execute the one or more computer programs to implement:

obtaining n groups of input video frames, at least one group of video frames comprising a color video frame and a depth video frame of a target face, n being a positive integer;

invoking an interactive liveness detection function to recognize the color video frames in the n groups of video frames, comprising:

invoking a neural network model in the interactive liveness detection function to obtain a position of a facial feature point on each of the color video frames; and invoking the interactive liveness detection function to determine, according to a distance between the facial feature points of the color video frames, whether the target face completes a target action;

invoking a second three-dimensional (3D) structured-light liveness detection function to recognize the depth video frames in the n groups of video frames; and determining, in response to both detection results of the interactive liveness detection function and the 3D structured-light liveness detection function indicating that a type of the target face being a liveness type, that the target face is a live target face, wherein the neural network model is obtained by:

obtaining a training sample set, the training sample set comprising a plurality of groups of sample face images and sample facial feature points;

invoking the interactive liveness detection function to recognize a sample face image of the plurality of groups of sample face images, to obtain a predicted facial feature point of a sample face;

comparing a sample facial feature point, of the sample facial feature points, corresponding to the sample face with the predicted facial feature point of the sample face to calculate an error loss; and training the neural network model of the interactive liveness detection function based on the error loss and by using an error backpropagation algorithm to obtain a trained neural network model of the interactive liveness detection function.

11. The apparatus according to claim 10, wherein the invoking the interactive liveness detection function to determine, according to a distance between the facial feature points on the color video frames, whether the target face completes a target action comprises:

invoking the interactive liveness detection function to calculate a ratio of a maximum horizontal distance to a maximum longitudinal distance between the facial feature points belonging to a same facial feature part, the same facial feature part comprising at least one of an eye or a mouth; and determining, in response to the ratio reaching a preset condition, that the target face completes the target action.

12. The apparatus according to claim 11, wherein the determining, in response to the ratio reaching a preset condition, that the target face completes the target action comprises:

determining, in response to the facial feature part being the eye and the ratio reaching a first distance threshold, that the target face completes a blinking action; and determining, in response to the facial feature part being the mouth and the ratio reaching a second distance threshold, that the target face completes a mouth opening action.

13. The apparatus according to claim 12, wherein the facial feature points comprise an eye feature point, and the eye feature point comprises a left canthus feature point, a right canthus feature point, an upper eyelid feature point, and a lower eyelid feature point; and the determining, in response to the facial feature part being the eye and the ratio reaching a first distance threshold, that the target face completes a blinking action comprises:

obtaining a first distance and a second distance, the first distance being a distance between the left canthus feature point and the right canthus feature point, and the second distance being a distance between the upper eyelid feature point and the lower eyelid feature point;

calculating a distance ratio between the first distance and the second distance;

calculating a mean value of the distance ratios of two eyes on the target face; and determining, in response to the mean value being greater than the first distance threshold, that the target face completes the blinking action.

14. The apparatus according to claim 11, wherein the interactive liveness detection function further comprises: at least one of a first classifier or a second classifier, and the determining, in response to the ratio reaching a preset condition, that the target face completes the target action comprises:

determining, in response to the facial feature part being the eye and the ratio being recognized by the first classifier as a first type, that the target face completes a blinking action; and determining, in response to the facial feature part being the mouth and the ratio being recognized by the second classifier as a second type, that the target face completes a mouth opening action.

15. The apparatus according to claim 10, wherein the determining, in response to both detection results of the interactive liveness detection function and the 3D structured-light liveness detection function indicating that a type of the target face being a liveness type, that the target face is a live target face comprises:

obtaining a first frame quantity and a second frame quantity, the first frame quantity being a quantity of color video frames comprising the target action and recognized by the interactive liveness detection function, and the second frame quantity being a quantity of depth video frames recognized by the 3D structured-light liveness detection function and conforming to depth information corresponding to the live face; and determining, in response to the first frame quantity being greater than a first preset threshold and the second frame quantity being greater than a second preset threshold, that the target face is the live target face.

16. A non-transitory computer-readable storage medium, storing at least one instruction, at least one program, a code set or an instruction set, the at least one instruction, the at least one program, the code set, or the instruction set being loaded and executed by a processor to implement:

obtaining n groups of input video frames, at least one group of video frames comprising a color video frame and a depth video frame of a target face, n being a positive integer;

invoking an interactive liveness detection function to recognize the color video frames in the n groups of video frames, comprising:

invoking a neural network model in the interactive liveness detection function to obtain a position of a facial feature point on each of the color video frames; and invoking the interactive liveness detection function to determine, according to a distance between the facial feature points of the color video frames, whether the target face completes a target action;

invoking a second three-dimensional (3D) structured-light liveness detection function to recognize the depth video frames in the n groups of video frames; and determining, in response to both detection results of the interactive liveness detection function and the 3D structured-light liveness detection function indicating that a type of the target face being a liveness type, that the target face is a live target face, wherein the neural network model is obtained by:

obtaining a training sample set, the training sample set comprising a plurality of groups of sample face images and sample facial feature points;

invoking the interactive liveness detection function to recognize a sample face image of the plurality of groups of sample face images, to obtain a predicted facial feature point of a sample face;

comparing a sample facial feature point, of the sample facial feature points, corresponding to the sample face with the predicted facial feature point of the sample face to calculate an error loss; and training the neural network model of the interactive liveness detection function based on the error loss and by using an error backpropagation algorithm to obtain a trained neural network model of the interactive liveness detection function.

\* \* \* \* \*